US008571997B2

(12) United States Patent
Walker

(10) Patent No.: US 8,571,997 B2
(45) Date of Patent: *Oct. 29, 2013

(54) SYSTEM AND METHOD FOR EVALUATING SPACE EFFICIENCY FOR OFFICE USERS

(75) Inventor: Michael Walker, Oak Brook, IL (US)

(73) Assignee: Spacelogik, LLC, Chicago, IL (US)

( * ) Notice: Subject to any disclaimer, the term of this patent is extended or adjusted under 35 U.S.C. 154(b) by 699 days.

This patent is subject to a terminal disclaimer.

(21) Appl. No.: 12/244,377

(22) Filed: Oct. 2, 2008

(65) Prior Publication Data

US 2009/0070173 A1   Mar. 12, 2009

Related U.S. Application Data

(63) Continuation-in-part of application No. 12/012,554, filed on Feb. 4, 2008, which is a continuation-in-part of application No. 11/287,124, filed on Nov. 22, 2005.

(51) Int. Cl.
*G06Q 10/00* (2012.01)

(52) U.S. Cl.
USPC .......................................................... 705/313

(58) Field of Classification Search
USPC ..................................... 705/1, 313
See application file for complete search history.

(56) References Cited

U.S. PATENT DOCUMENTS

| 5,590,268 | A | 12/1996 | Doi et al. |
| 6,446,030 | B1 | 9/2002 | Hoffman et al. |
| 6,446,053 | B1 | 9/2002 | Elliott |
| 6,701,281 | B2 | 3/2004 | Satoh et al. |
| 6,782,119 | B1 | 8/2004 | Barlett |
| 2002/0035408 | A1 | 3/2002 | Smith |
| 2003/0009315 | A1 | 1/2003 | Thomas et al. |
| 2003/0191723 | A1 | 10/2003 | Foretich et al. |
| 2004/0073508 | A1* | 4/2004 | Foster et al. ............... 705/38 |
| 2004/0111282 | A1 | 6/2004 | Haji-Ioannou |
| 2004/0122628 | A1 | 6/2004 | Laurie |
| 2004/0172261 | A1 | 9/2004 | Davidoff et al. |

OTHER PUBLICATIONS

Thomsett, Michael; "Real estate investors pocket calculator" Oct. 2005, Amacom.*
LeaseCorp Floorplan & LeaseAnalysis Software, LeaseCorp., Jan. 28, 2001.

* cited by examiner

*Primary Examiner* — Jami A Plucinski
*Assistant Examiner* — Vern Cumarasegaran

(57) ABSTRACT

A system and method for identifying and calculating inefficiencies in a real estate space includes determining the areas of rooms required by a user. A circulation loss is calculated. The total of the room areas and the circulation loss are added to determine a net usable space required by the user. The net usable amount of space is multiplied by the subject building's inefficiency measure to identify the amount of rentable space necessary given an efficient program, space plan and building. The user's updated, proposed space program is compared to the user's current or original space program to identify efficiency losses. The system may be configured on a network computer system or a standalone computer.

23 Claims, 35 Drawing Sheets

Building Name:
Address:
Floor:
City:
Date Surveyed:
Surveyor:

|  | Landlord | Leasecorp |  |
|---|---|---|---|
| 1. What is the rentable square footage of the floorplate? | 24,000 | 23,621 Diff: 379 |  |
| 2. What are the dimensions of the typical column (finished and squared)? | 27.00 by 25.25 inches |  |  |
| 3. Number of columns on each floor (in rentable area only): | 22 | 104.16 |  |
| 4. Is the building a square/rectangle? | Yes |  |  |
| 5. If the building IS a square/rectangle, the dimensions are: | 198.25 by 127.83 feet |  |  |
| 6. If the building IS NOT a square/rectangle, how many sides are there? | 0 Perimeter 652.17 |  |  |

|  | Side 1 | Side 2 | Side 3 | Side 4 | Side 5 | Side 6 | Side 7 | Side 8 | Side 9 | Side 10 |
|---|---|---|---|---|---|---|---|---|---|---|
| Outside perimeter of dominant face | - | - | - | - | - | - | - | - | - | - |
| Number of duplicated sides | 1.0 | 1.0 | 1.0 | 1.0 | 1.0 | 1.0 | 1.0 | 1.0 | 1.0 | 1.0 |
| 7. Is building side an arc or angle?* | N/A | N/A | N/A | N/A | N/A | N/A | N/A | N/A | N/A | N/A |
| Theta | - | - | - | - | - | - | - | - | - | - |
| If an arc, radius | - | - | - | - | - | - | - | - | - | - |

\* Workstation to Office ratio for angles and arcs is:   50.0% / 50.0%

Arc and Angle Losses: ................................................................................   -

| 8. Distance from dominant face to usable floor space: | 5.25 inches |  |
|---|---|---|
| 9. What percentage of the floor is encumbered (not including columns)? | 100% | 285.32 |
| 10. Unusual losses: | | 55.05 |

|  |  |  |  |  |
|---|---|---|---|---|
| Corner columns | 4.43 | SF | 4 | duplicates |
| Interior columns | 4.00 | SF | 2 | duplicates |
| Water columns | 14.67 | SF | 2 | duplicates |

Building's net inefficiency:   3.4%                                                        823.53

| 11. What is the building's single tenant loss factor (based on Landlord rsf)? | 9.40% | 2,256.00 |
|---|---|---|
| 12. What is the building's multi-tenant loss factor (based on Landlord rsf)? | 12.77% | 3,064.80 |

SINGLE TENANT INEFFICIENCY FACTOR:   13.2%

MULTI TENANT INEFFICIENCY FACTOR:   16.6%

FIG. 7

Building Name:
Address:
Floor:
City:
Date Surveyed:
Surveyor:

1. What is the rentable square footage of the floorplate as identified by landlord? [24,800]

2. Column losses:
   - Corner columns [4.43] SF [4] duplicates
   - Interior columns [4.00] SF [2] duplicates
   - Water columns [14.67] SF [2] duplicates 3. Total of all Column losses from section 2 above: [55.05] #1

4. Is the building a square/rectangle? [Yes]
5. If the building IS a square/rectangle, the dimensions are: [198.25] by [127.83] feet
6. If the building IS NOT a square/rectangle, how many sides are there? [0] Perimeter [652.17]

|  | Side 1 | Side 2 | Side 3 | Side 4 | Side 5 | Side 6 | Side 7 | Side 8 | Side 9 | Side 10 |
|---|---|---|---|---|---|---|---|---|---|---|
| Outside perimeter of dominant face | - | - | - | - | - | - | - | - | - | |
| Number of duplicated sides | 1.0 | 1.0 | 1.0 | 1.0 | 1.0 | 1.0 | 1.0 | 1.0 | 1.0 | |
| 7. Is building side an arc or angle?* | N/A | N/A | N/A | N/A | N/A | N/A | N/A | N/A | N/A | |
| Theta | - | - | - | - | - | - | - | - | - | |
| If an arc, radius | - | - | - | - | - | - | - | - | - | |

*Workstation to Office ratio for angles and arcs is: 50.0% / 50.0%

Total Arch & Angle (building shape) losses: [ - ] #2

8. Distance from dominant face to usable floor space: [5.25] inches
9. What percentage of the floor is encumbered [100%]

Total Perimeter encumbrance losses: [285.32] #3

10. Total hand measured unusual losses: [104.75] #4

|  | SINGLE TENANT | MULTI TENANT |
|---|---|---|
| 11. Usable square feet (BOMA): (BOMA measured) | [19,800] SF | [19,220] SF |
| Total Efficiency Losses above: (Total of yellow highlight areas 1,2,3,4 above) | [444.5] SF | [444.5] SF |
| NET USABLE square foot: (Usable SF minus Efficiency Losses above) | [19,355.5] SF | [18,775.5] SF |
| Landlord's Rentable SF: (As published or indicated by landlord) | [24,000] SF | [24,000] SF |
| Efficiency Ratio: (Landlord's Rentable SF / Net usable SF) | [1.24] | [1.28] |

FIG. 8

Space & Construction Summary

Space Summary:

| Area | Area Size | Square Feet | Qty | Total |
|---|---|---|---|---|
| Reception Area | 15x20 | 300 | 1 | 300 |
| Coat Closet | 3x10 | 30 | 2 | 60 |
| Large Conference Room | 18x30 | 540 | 1 | 540 |
| Small Conference Room | 15x18 | 270 | 1 | 270 |
| Executive Offices | 15x18 | 270 | 3 | 810 |
| Visitor Offices | 10x15 | 150 | 2 | 300 |
| Trading Area | 8x10 | 80 | 6 | 480 |
| Large Workstations | 10x10 | 100 | 24 | 2,400 |
| Small Workstations | 7x10 | 70 | 19 | 1,330 |
| Storage Area | 10x20 | 200 | 1 | 200 |
| Copy/fax Area | 10x25 | 250 | 1 | 250 |
| Computer/telephone Room | 10x20 | 200 | 1 | 200 |
| Break Room | 15x20 | 300 | 1 | 300 |
| Administrative Assistant | 20x20 | 400 | 1 | 400 |

Estimated Basic Square Feet: 7,840
Plus Circulation Loss: 2,258 — 132
Estimated Usable Square Feet: 10,098
Plus 20.00% Building Inefficiency: 2,020 — 134
Estimated Rentable Square Feet: 12,118

FIG. 9

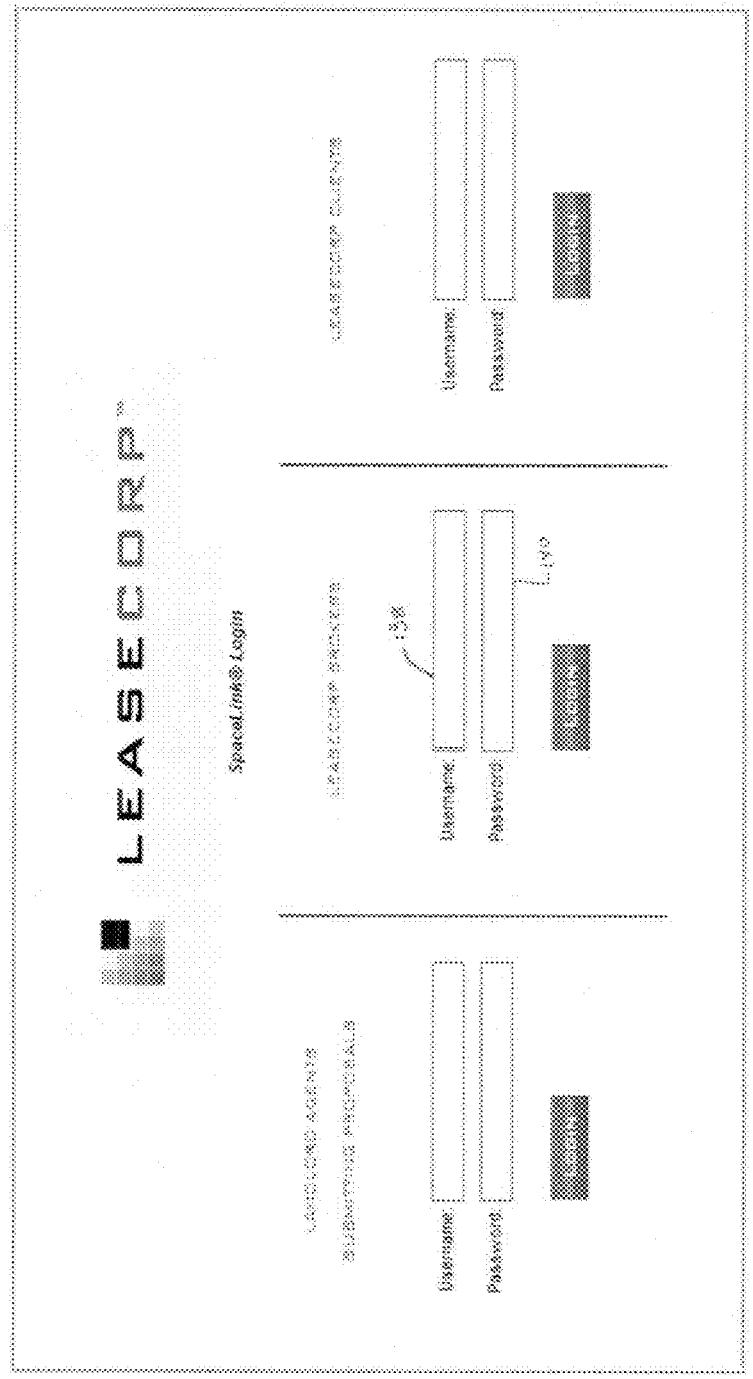

LEASECORP

SHOW: ○ All ● Active ○ Inactive ○ Deleted   ALL A B C D E F G H I J K L M N O P Q R S T U V W X Y Z

| | Name | URL | Status | |
|---|---|---|---|---|
| | A.J. Ballard | www.ajg.com | active | Add Broker |
| | 4GC New Customer Rtech38 | www.leasecorp84.com | active | Add Broker |
| | About Staffing | | active | Add Broker |
| | Accenture | www.accenture.com | active | Add Broker |
| | August Hodges | https:// | active | Add Broker |
| | Barnes & Thornburg LLP | http://www.btlaw.com | active | Add Broker |
| | BiTech Company | | active | Add Broker |
| | Chicago Equity Partners | http://www.chicagoequitypartners.com | active | Add Broker |
| | CheckK | | active | Add Broker |
| | Construction TESTER | | active | Add Broker |
| | Cohen Financial Staffing Inc | http://www.cbetech-qa.conleygroup.11 | active | Add Broker |
| | Corley Financial Corporation | www.conleymortgage.com | active | Add Broker |
| | CS Kitchen | | active | Add Broker |
| | Dones Mortgage Company | http://www.dmsolutions.com/ | active | Add Broker |
| | Daniel Stacking Solutions | http://www.staples.com/ | active | Add Broker |
| | DLA Piper | | active | Add Broker |
| | Dooney Barlow Bank RB | | active | Add Broker |
| | ephesiarg firm | www.greatlandtrust.com | active | Add Broker |
| | fireEngineers | | active | Add Broker |
| | Global Market | | active | Add Broker |
| | gluten diaspora company | | active | Add Broker |
| | Graphene Food Company 2 | www.gusteau.com | active | Add Broker |
| | Guidance Chicago | www.hoodmanager.com | active | Add Broker |
| | Hoslnor, Smits | | active | Add Broker |
| | Ingram Navigation, d.b. | www.instanet.com | active | Add Broker |
| | Instanet | | active | Add Broker |

LEASECORP

General Info | REDID.COM | Financial Analysis | SpaceLink 3 | Reports

SQUARE FOOTAGE
Net: 0
Circulation Loss: 0
Net Usable: 0
Rentable: 0

There are no Rooms for this Floorplan

Room No. 10
# of Rooms: 1
Room Type:
Description: Break Room / Lunch Room
Size: Coat Closet
Coffee Bar
Computer / Telephone Room
Wall Type: Conference Room
Demo Room
File Area
Library
Spaceplan Info: Mailroom
There are no Sp Print Station
Private Office(s)
Construction: Rest Room(s)
There are no Ca Shared Office(s)
Storage Area
Testing Area
Training Room
Adjacencies: Work Area
There are no Ac Workstations Dedicated: 0          Doors: 0
Duplex: 0             Boxes: 0
GFI: 0                Stud: 0
Coax: 0               Cables: 0
Floor Type:

Internet | Protected Mode: On          100%

Fig. 16

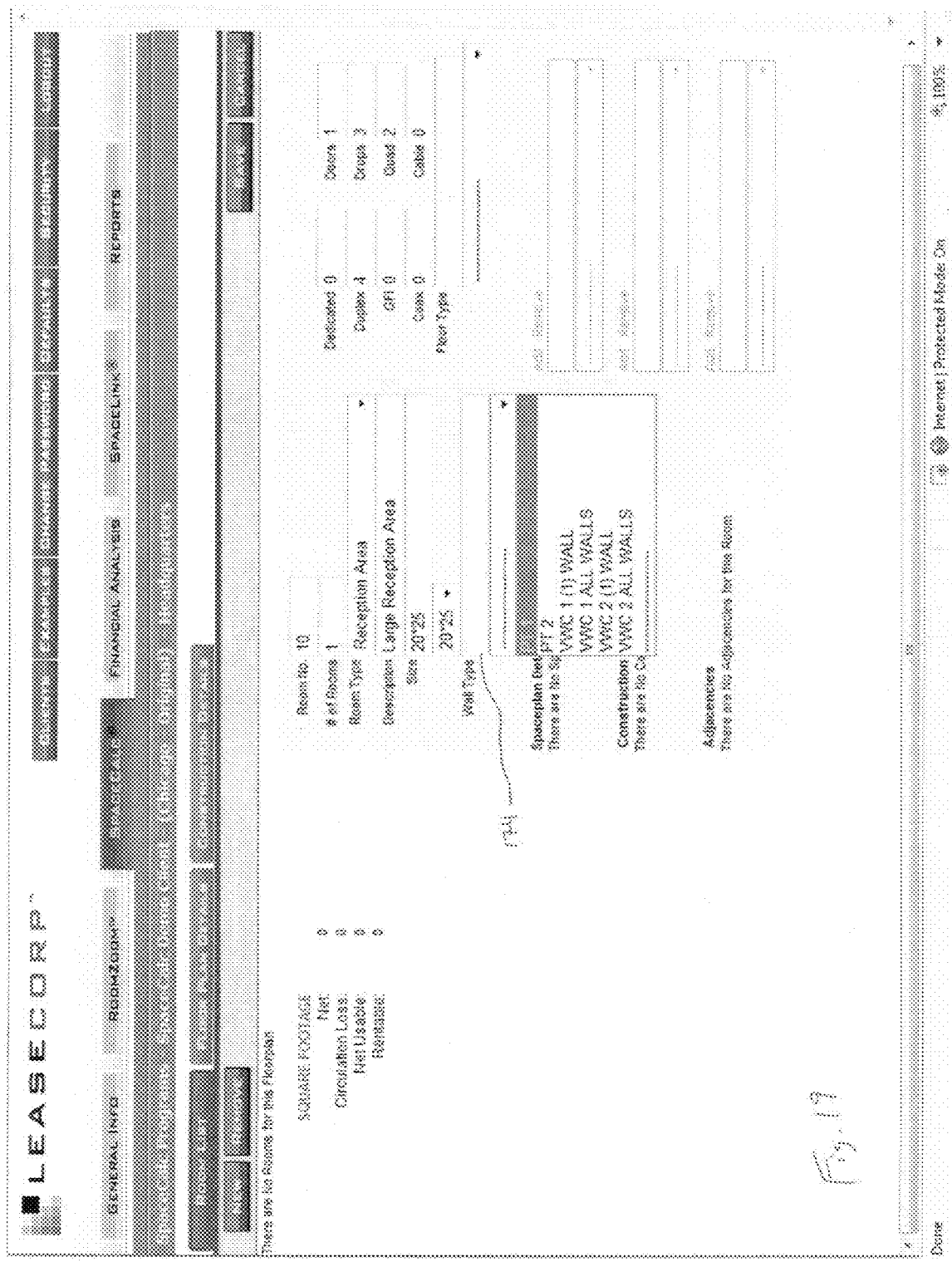

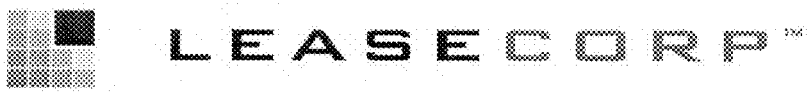

|   | Category | Original Space Plan | New Space Plan | Square Foot Reduction | %Reduction |
|---|---|---|---|---|---|
| 298 | Rentable Square Feet | 21,745 | 17,829 | 3,916 | 18.01% |
| 292 | Programming Inefficiency | 13,859 | 12,216 | 2,578* | 11.86% |
| 294 | Building Inefficiency | 19.1% | 14.5% | 840 | 3.86% |
|   | Space Plan Inefficiency (Circulation) | 4,399 | 3,355 | 1,044 | 4.80% |
| 296 | Employee Count | 100 | 100 | 0 | 0 |
|   | Square Feet per Employee | 217 | 178 | 39 | 18.01% |

*Programming Inefficiency takes into account building and circulation efficiency ratios.

SPACE EFFICIENCY SUMMARY

Based on the attached Space & Construction Summary and space plan, we project a reduction in space by approximately 3,916 square feet, a 18.01% reduction.

COST SAVINGS SUMMARY

Based on average lease rates of $26.25 / foot, this reduction equates to potential savings of $102,795 per year and $1,027,950 on a ten-year commitment.
* At a 5% profit margin, this represents $2,055,900 in annual sales.
* To achieve similar results, tenant would require a rental rate reduction of $4.73 per foot, per year.

REAL ESTATE EXPENSE PER EMPLOYEE (REEPE™)

The annual original REEPE is $5,708 per year. The new annual REEPE is $4,680 per year.

WITH THESE SAVINGS, YOU CAN ...

* Upgrade the quality of your office building by $5.77 per foot.
* Spend an additional $57.66 per foot on leasehold improvements.
* Hire 22 additional employees with no additional rental costs.
* Give your entire staff a $1,028 bonus every year for the next ten years.

Fig. 34

SYSTEM AND METHOD FOR EVALUATING SPACE EFFICIENCY FOR OFFICE USERS

REFERENCE TO RELATED APPLICATIONS

This application is a continuation-in-part of U.S. application Ser. No. 12/012,554, filed Feb. 4, 2008, currently pending, which application is a continuation-in-part of U.S. application Ser. No. 11/287,124, filed Nov. 22, 2005, currently pending.

TECHNICAL FIELD

The present invention generally relates to systems and methods for evaluating commercial real estate spaces and, more particularly, to a system and method for identifying and calculating inefficiencies that result in tenants occupying more office space than necessary.

BACKGROUND OF THE INVENTION

Commercial tenants typically pay a monthly rent for leased space for offices or the like based on the square footage of the space. Landlords typically calculate commercial office rental rates based on taxes, operating expenses, debt service, tenant construction costs, marketing costs and profit (or return on landlord investment). Landlords evaluate these costs on a per-square-foot basis. The only part of the rent a tenant typically can negotiates the profit segment, which is usually 5% to 15% of the total rental rate because all of the other landlord expenses listed above are predominantly fixed. By reducing the amount of space required by a tenant, however, the effect is cost reduction on the entire rent, not just the profit portion. A tenant may thus realize substantial rent savings if they reduce the space they lease by identifying and eliminating areas in their space that are not needed or can be downsized, reducing inefficient architectural designs and avoiding buildings that have characteristics that prevent the most efficient use of space.

In view of the above, it is becoming increasingly important for tenants to accurately determine the amount of leased space that they actually require so design and architectural inefficiencies can be identified and eliminated. Real estate leasing firms, brokers and professional licensed architects predominantly use a multiplier to calculate space requirements. For example, the multiplier could be 200 square feet per person so that a company with 50 people would have a projected requirement of 10,000 square feet. But some companies need more space per person because of the size and mix of executive offices and workstations. For example, attorneys and accountants may need 250-300 square feet per person because they typically use a higher ratio of offices to cubicles. Insurance companies and software consultants, however, typically use more cubicles than offices and may need only 150 square feet per person.

As such, real estate leasing firms and architectural firms may increase or decrease the rule of thumb to be industry specific. However, even when adjusting the rule of thumb for different industries, the professionals typically don't consider that every company has its own distinct space requirements. An analysis of the needs of two companies with similar revenues in the same industry may provide two very different results. For example, one company might want a twenty-person boardroom while the other wants a twelve-person conference room. One may decide a 6'×6' cube is big enough for employees while the other will opt for 8'×8' workstations (almost double the space). One president might want a modest 12'×15' office, the other a 20'×30' oasis with a private washroom and a wet bar. Companies may also have their own set of workspace standards, which can vary as much as 75% across an industry. Despite this variety of needs from company to company, brokers and architectural firms typically still use the antiquated 'rule of thumb' multiplier approach to estimate space requirements, which often leads to considerable over-sizing of the tenant's space.

Office buildings often feature characteristics which reduce the amount of actual usable square footage and, in turn, increase the amount of space tenants will need to lease. More specifically, because of numerous factors, the space efficiency of buildings varies greatly. Columns, HVAC apparatus, building loss (or "add on") factors and unusual building shapes (curved sides and any angles other than 90°) increase space inefficiency and are all elements that can vary greatly from building to building. As a result, the actual usable space that is available to a tenant is actually less than the amount advertised by the landlord. Because of these varying inefficiencies from building to building, an office user might find that they require 10,000 square feet in one building and 11,000 square feet in another less efficient building. By understanding this "space efficiency" concept, a tenant can realize substantial rent savings.

Additionally, a tenant may also be required to lease more space than necessary because the architect, designer or space planner (collectively referred to as "Space Planner") did not fit the user's requirements into the subject space as efficiently as possible. Although it could be argued that the Space Planner might do this intentionally to increase the amount of their bill (Space Planners are typically bill by the square foot, not the hour), it could also be for other reasons. For example, the Space Planner might not understand the impact that an additional 5% or 10% in office space has on the tenant's occupancy costs. On a ten-year lease, an additional 10% in office space would mean an addition $600,000 in rent to a 20,000 square foot user ($30 per foot rental rate).

Another reason a Space Planner may not lay out space as efficiency as possible might be that they lack knowledge and education on the subject. A search was conducted on the course description web site pages at 25 top United States architectural schools. The keywords used in the search were 'space efficiency' and only one course was located in the 25 school search, indicating the architectural schools in the United States have a greater emphasis on aesthetic design than they do on space efficiency. Therefore, the lack of attention to efficient space design by Space Planners in the United States may simply beta result of lack of education on the subject.

An office space tenant may also find that technological advances contribute to leasing too much space. For example, a tenant might have needed 500 square feet for their filing when they signed their previous lease. Today, with the ability to store documents digitally, that same tenant might only require 200 square feet for their files. By the same token, the reduction in the size of computer processors might have the same effect on the size of that tenant's computer room.

Other miscellaneous factors might also contribute to over-sizing of office space. A company's standard office sizes may change during the course of an office lease and now dictate that an employee that once had a 15'×20' office should now be in a 15'×15' office. In some cases, the company may have accepted the larger office at their lease inception because it was left from the previous tenant and the tenant wanted to reduce the amount of construction that needed to be done.

It may be argued that any one of the causes that result in inefficient space leasing may be, at least partially, evident to a typical tenant. However, it would be not only be very difficult for someone not experienced in the industry to identify the full inefficiency impact of any one particular cause, but it would be virtually impossible for them to accurately estimate the total loss for all inefficiencies without the knowledge and tools necessary to calculate the losses.

When a tenant is considering the potential relocation of their office space, the option of remaining in their current space typically has a monetary advantage. This is because the cost to move the office is not only time intensive but expensive as well. Additionally, there is often the need to perform construction to modify a second generation space so it meets the needs of the new tenant. Alternatively, the tenant may consider moving into raw space that has never been occupied before, in which case a full build out of the space will be required. Either of these options will require an investment of construction dollars that are typically either greatly reduced or eliminated if the tenant elects to stay in their current location.

Because of the construction expense and other relocation costs related to moving, the tenant would generally opt to stay in their current location to minimize cost. If all else were equal, there would need to be a compelling financial reason for the tenant to move. Because office buildings are generally leased or sold based on the square footage used, the opportunity to move into less, more efficient space would offset some of the up front expenses of relocation. However, unless a tenant could accurately project the amount of space required if all efficiency tactics were implemented, they may underestimate the potential savings from moving into more efficient space and decide not to relocate based on inaccurate information.

Therefore, there exists a need for a tenant to be able to identify the inefficiencies in their current leased office space and project the amount of space they should require (and potential occupancy cost reduction) if all or any one of the inefficiencies were eliminated.

BRIEF DESCRIPTION OF THE DRAWINGS

FIG. 1 shows a circulation factor data entry screen;

FIG. 4 shows an efficiency data entry screen;

FIG. 7 shows a report produced by the system and method of FIGS. 1, 3 and 4;

FIG. 8 shows an alternative version of the report of FIG. 7;

FIG. 9 shows another report produced by the system and method of FIGS. 1, 3 and 4;

FIG. 10-33 are screen prints of displays provided by an embodiment of the system and method of the present invention;

FIG. 34 shows a report produced by the embodiment of the system and method of the present invention;

DETAILED DESCRIPTION OF THE INVENTION

Figure 2:
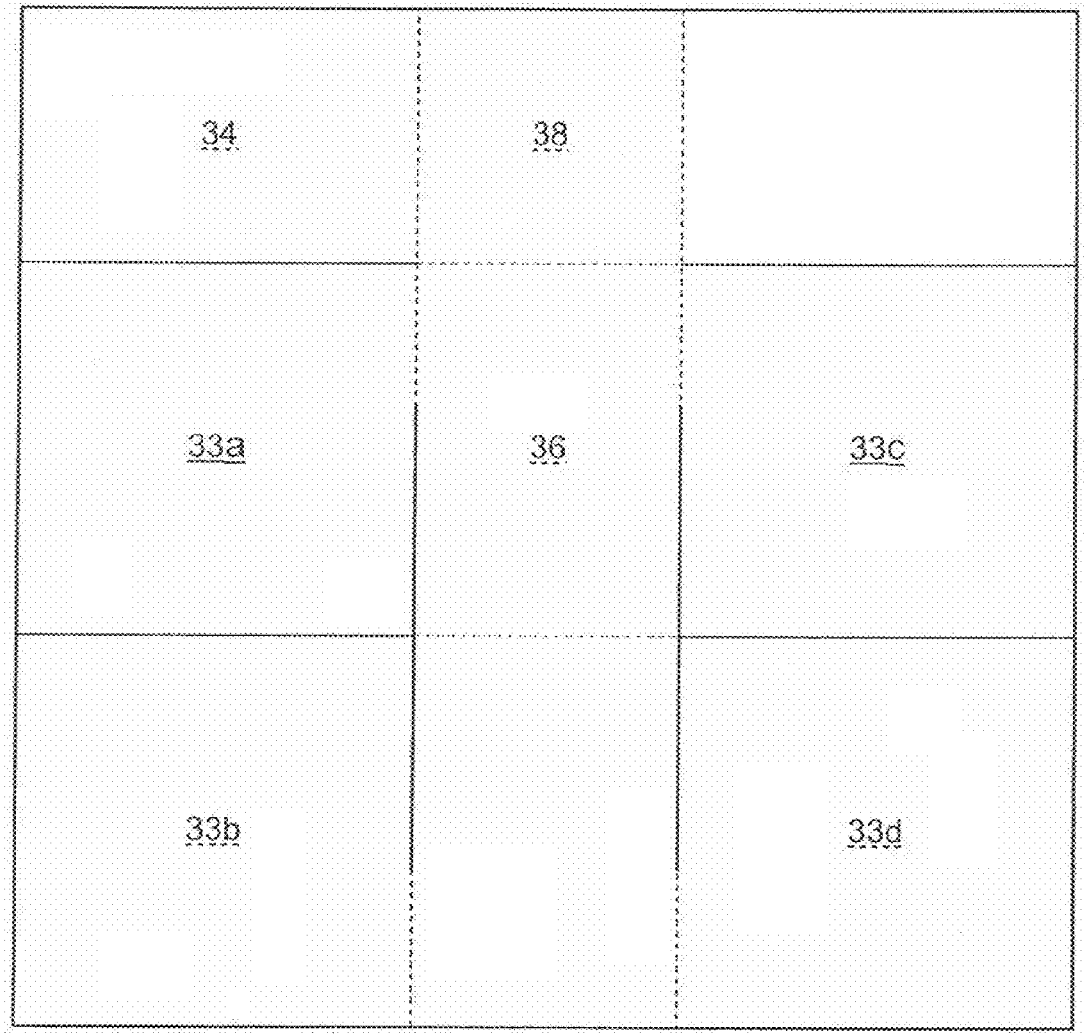
FIG. 2 is a plan view of a four workstation group and corresponding aisles.

A system and method uses a two-phase process to determine the correct amount of space required for a tenant in a building. During the first phase, formulas are used to calculate the amount of circulation area needed on a room-by-room basis in accordance with the office space requirements for the tenant. The projected circulation areas and office space requirements are then added to determine the "pure space" required by the tenant. The pure space is the amount of space required in a perfectly efficient environment—a perfect rectangle with no columns or inefficiencies of any kind. As a result, the system and method takes a set of given office space requirements (reception areas, offices, workstations, file areas, etc.), and projects how much circulation area is required (aisle ways, ingress, egress, etc.) to establish the ideal or pure space.

During the second phase, the pure space calculated during the first phase is multiplied by a "building inefficiency factor." No building is 100% efficient in that each has elements that affect just how efficient it is in terms of usable floor space. A building inefficiency factor provides a way of measuring the relative efficiency of various office buildings. This factor is expressed in percentage form for a building and, when multiplied by any amount of pure space projects how much additional space is required for building inefficiencies (tie "building efficiency loss"). The pure space and the additional planning area required because of building inefficiencies can be added to establish the total rentable square footage required by a tenant for a subject building.

Phase 1: Circulation Factor Calculation

Figure 1:
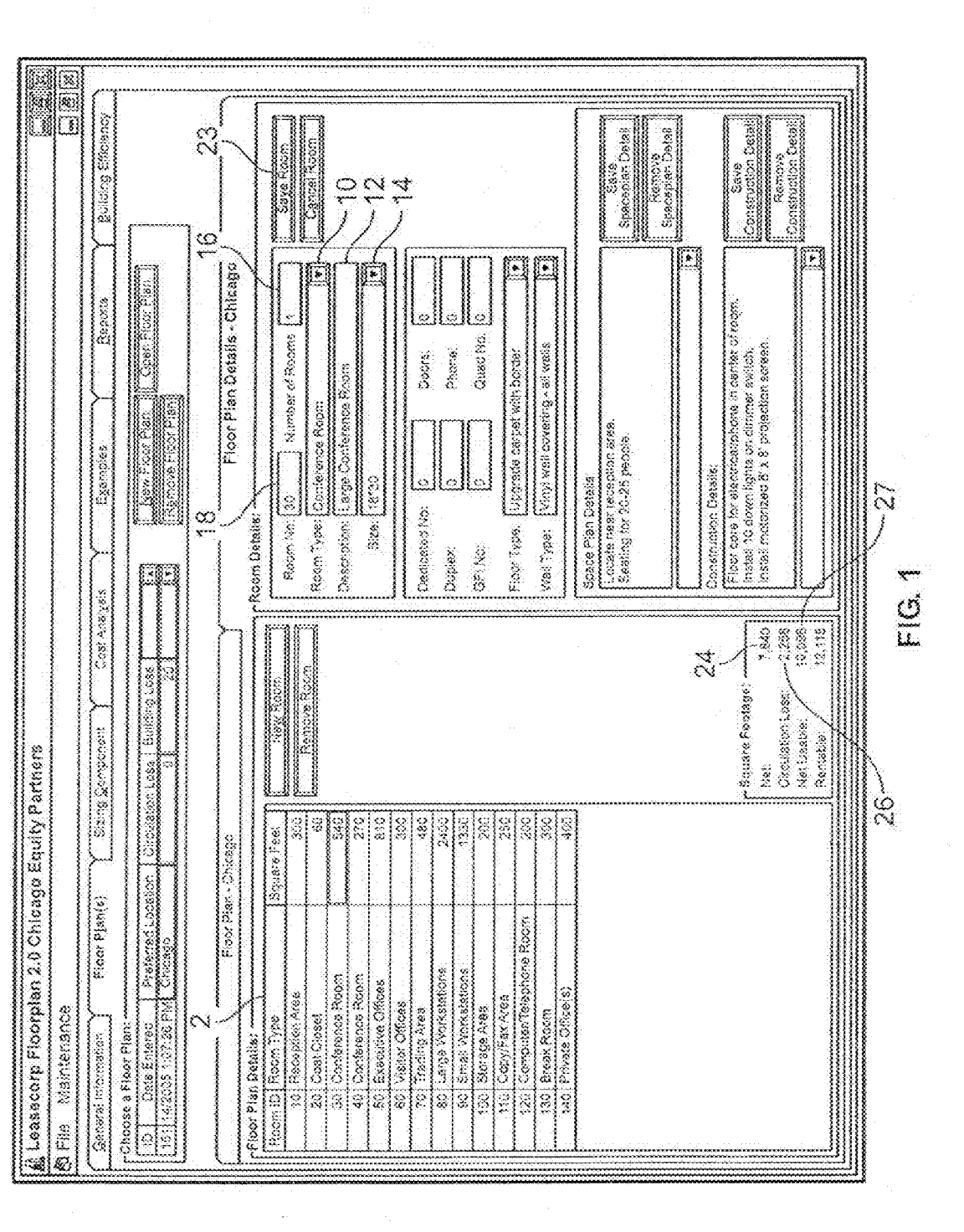

A circulation factor data entry screen is presented in FIG. 1. The screen or template is displayed to a user on a standard computer workstation display. The user enters into field 10 the room type (conference room, reception area, executive office, etc.). Field 10 preferably uses a pull-down menu to ensure that room names are entered in a consistent fashion. Any additional room descriptive details are entered in field 12 while the room size is entered in field 14. Field 14 preferably also features a pull-down menu of standard room sizes. If a number of identical rooms are to be entered, field 16 may be set to the appropriate number of rooms to eliminate redundant data entry. Each room entry is automatically assigned an identification number, which is indicated in field 18, and a summary of the data entered is presented in table 22 when the user selects the "Save Room" button 23.

A running total of the net square footage is maintained in field 24 of the screen of FIG. 1 as the data is entered. The circulation loss or factor is also calculated for each room as the data is entered and a running total of the circulation factor is maintained in field 26. The total of the net square footage required by the tenant and the circulation factors for the rooms is the net usable space required, which is calculated and displayed in field 32 of FIG. 1.

The formula used to calculate a circulation factor for a room or other user space requirement is selected by the system based on the square footage of the room or user space requirement.

For standard areas greater than or equal to 100 square feet, the circulation factor is calculated by multiplying 2.5 feet (½ the width of a standard aisle) times the square root of the space in question. For example, a 10'×15' office would have a circulation factor of 30.62, which is 2.5 times 12.25 (12.25 is the square root of 150 square feet). While these example calculations and the example calculations below are based on the default standard aisle width of 5 feet and the default secondary aisle width of 4 feet, the system accommodates alternative aisle dimensions that may be provided by the user.

For areas equal to or greater than 50 square feet and less than 100 square feet, the circulation factor calculation assumes a workstation with side wall panels and is therefore slightly more complicated. The square root of the space in question is initially multiplied by 2.5 feet (½ the width of a standard aisle). Since workstations of this size are usually in "packs" or "clusters" of four, stacked two high, such as workstations 33a, 33b, 33c and 33d illustrated in FIG. 2, the primary aisle 34 in FIG. 2, is assumed to be shared by two workstations (33a and 33b). As a result, this number is divided by two.

The circulation factor must also include an additional calculation for aisles needed to access the interior workstations. Since these secondary aisles, illustrated at 36 in FIG. 2, are typically 4 feet, the square root of the area is also multiplied by 2 feet (½ of a 4 foot aisle) and added to the previous total. In addition, other small adjustments in the calculation are made. These include the width of the workstation side wall panels being used. For example, an 8'×8' workstation using 2" panels is actually 8' 4"×8' 4". The user may provide the system with alternative panel thicknesses for use in the calculations. The aisle that links the primary aisle with the secondary aisle, illustrated at 38 in FIG. 2, must also be included. This is accomplished by assuming a 4'×2.5' aisle (width of secondary aisle×½ the width of the primary aisle) that is divided by four since four workstations share the area.

As an example, the 8'×8' workstation of FIG. 2 carries the following circulation area requirement:

1) For primary aisle 34 in FIG. 2. {8' 4" (since 4" for panels)*2.5' (=½ of a 5' aisle)}/2 (because shared by stations 33a and 33b)=10.41 square feet
2) Workstation wall panel area: (8' 4"*8' 4")−(8'*8') (=area with panels−area without panels)=5.44 square feet
3) For secondary aisle 36 in FIG. 2: 8' 4"*2 (½ of a 4' aisle)=16.67 square feet
4) For aisle 38 in FIG. 2: {4' (width of secondary aisle)*2.5' (=½ width of main aisle)}/4 (=number of stations sharing area)=2.5 square feet
TOTAL: 10.41+5.44+16.67+2.5=35.02 square feet circulation factor per workstation For areas less than 50 square feet, the calculation of the circulation factor is almost identical to that for areas greater than 50 square feet and less than 100 square feet except that the smaller area would dictate a smaller individual workstation (for example, 7'×7') and thus a six-workstation cluster instead of a four-workstation cluster. That would, in turn, change the calculations in that the calculation for aisle 34 in FIG. 2 would be divided by three instead of two and the calculation for aisle 38 in FIG. 2 would be divided by six instead of four. As a result, the calculation 1) of the above example would feature a denominator of three instead of two and the calculation 4) of the above example would feature a denominator of six instead of four.

For areas where one dimension is less than or equal to 3 feet, no circulation factor is needed because the short depth implies a coat closet or filing cabinet. These are usually accessible from the aisle way and don't require circulation.

The circulation factor must also address municipal fire code egress considerations. More specifically, most municipalities have fire codes that, on average, specify mandatory egress points for every 4,000 rentable square feet. As a result, the circulation factor must include square footage for an additional exit aisle having a size of 5'×20' for every 4,000 rentable square feet.

The following formula reflects the above logic and considerations and may be used for calculating the circulation factors for user space requirements:

```
DSQUAREFEET = LLENGTH * LWIDTH
IF LLENGTH OR LWIDTH <= 3 THEN
        DRENTABLESQUAREFEET = DSQUAREFEET
ELSEIF DSQUAREFEET < 50 THEN
        DAREA = (LLENGTH + (0.167 * DPW)) * (LWIDTH + (0.167 * DPW))
        DPANELS = DAREA − DSQUAREFEET
        DSAAREA = SQR(DAREA) * DSA * 0.5
        DPAAREA = SQR(DAREA) * DPA * 0.5/3
        DCROSS = (DPA/2 * DSA)/6
        DRENTABLESQUAREFEET = DSQUAREFEET + DPANELS + DSAAREA + DPAAREA + DCROSS
ELSEIF DSQUAREFEET < 100 THEN
        DAREA = (LLENGTH + (0.167 * DPW)) * (LWIDTH + (0.167 DPW))
        DPANELS = DAREA − DSQUAREFEET
        DSAAREA = SQR(DAREA) * DSA * 0.5
        DPAAREA = SQR(DAREA) * DPA * 0.5/2
        DCROSS = (DPA/2 * DSA)/4
        DRENTABLESQUAREFEET = DSQUAREFEET + DPANELS + DSAAREA + DPAAREA + DCROSS
ELSEIF DSQUAREFEET > 100 THEN
        DRENTABLESQUAREFEET = DSQUAREFEET + (SQR(DSQUAREFEET) * 0.5 * DPA/12)
END IF
        DRENTABLESQUAREFEET = DRENTABLESQUAREFEET * LROOMS
Where:  LWIDTH = WIDTH OF OFFICE OR CUBICLE (measured from panel interior surfaces)
        LLENGTH = LENGTH OF OFFICE OR CUBICLE (measured from panel interior surfaces)
        DPW = PANEL WIDTH (DEFAULT = 2")
        DPA = PRIMARY AISLE WIDTH (DEFAULT = 5')
        DSA = SECONDARY AISLE WIDTH (DEFAULT = 4')
        LROOMS = NUMBER OF OFFICES OR CUBICLES
```

Phase 2: Determining Building Inefficiency Factors

Figure 3:
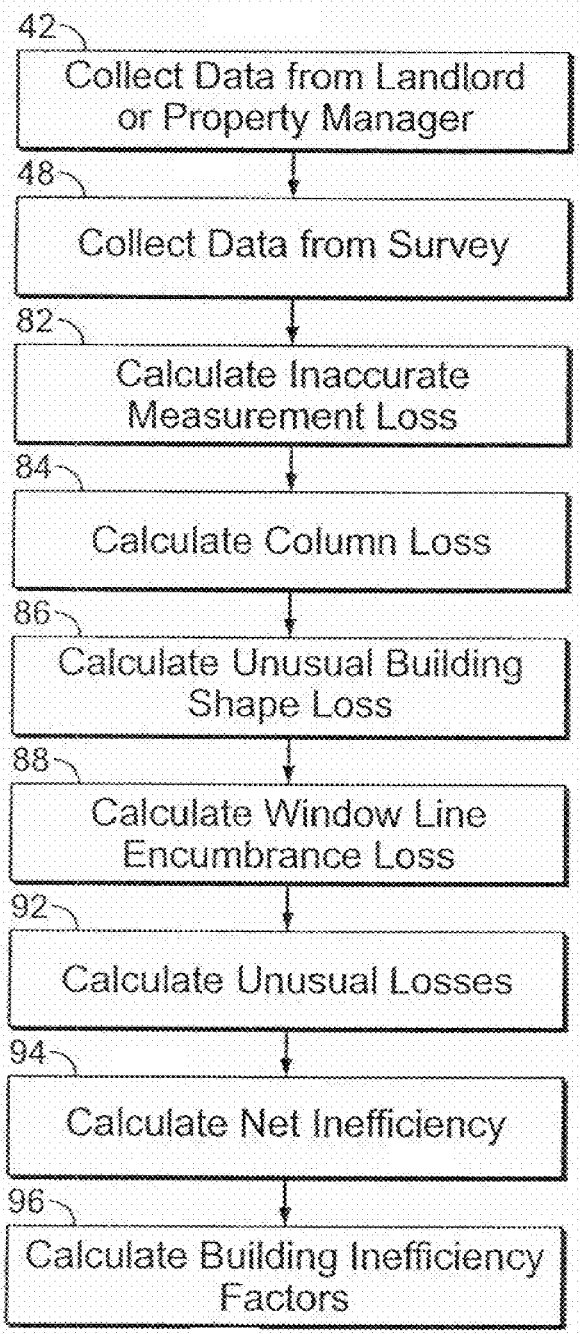
FIG. 3 is a flow chart illustrating the steps for calculating building inefficiency factors.
Figure 4:
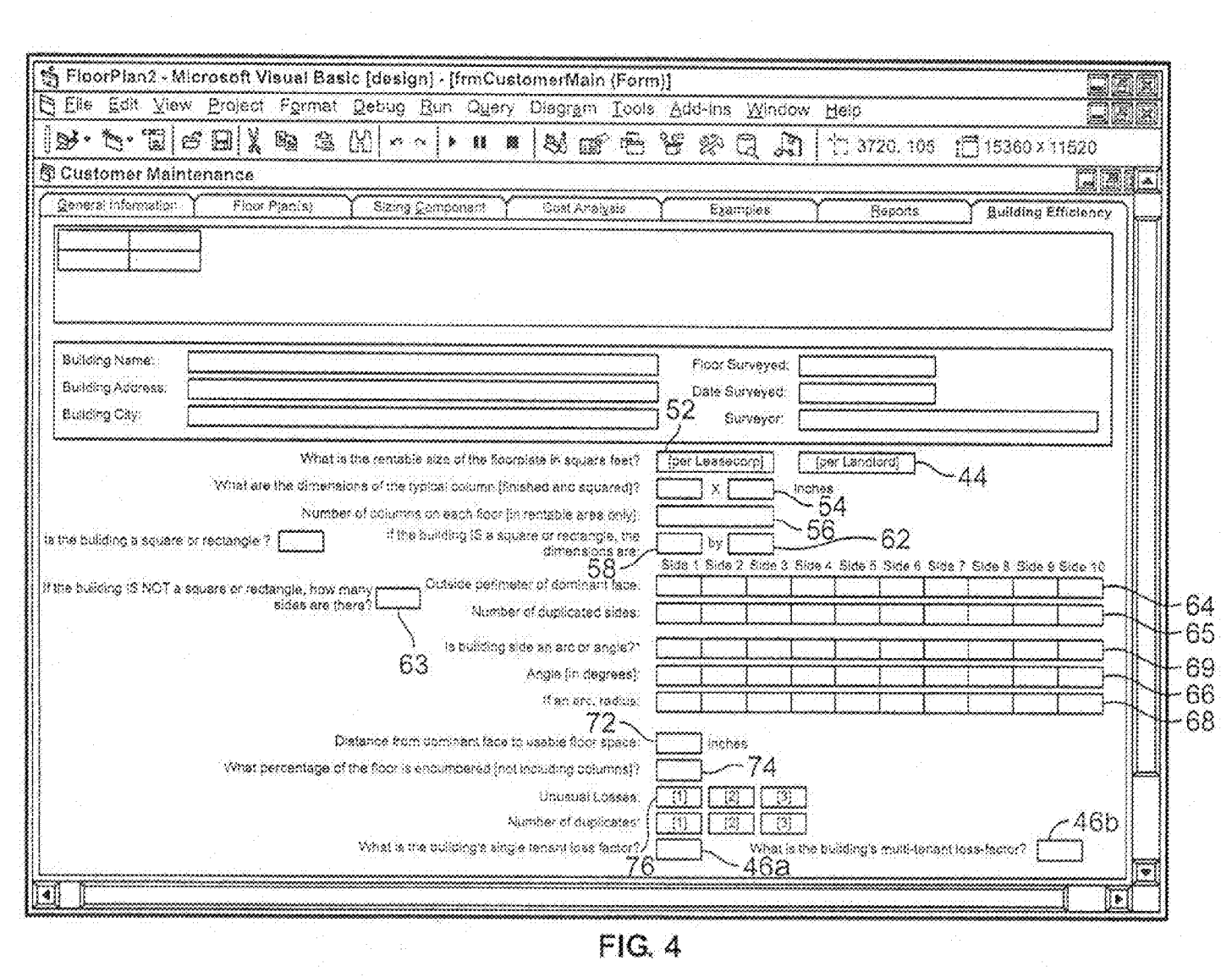

The flowchart of FIG. 3 shows the process for determining the building inefficiency factors. As indicated by block 42 of FIG. 3, the first step in calculating the inefficiency factors for a building is collecting data from the building landlord or property manager. The building efficiency data entry screen is presented in FIG. 4. The data collected from the landlord or property manager includes the rentable square footage of the space, which is entered in field 44 of FIG. 4, as well as the single tenant loss factor and the multi-tenant loss factor, which are entered in fields 46a and 46b, respectively.

Next, as indicated by block 48 of FIG. 3, some additional detailed information for the space is also obtained via an on-site survey or by utilizing building drawings. This information includes the rentable square footage of the space which is determined in accordance with standards issued by Building Owners Management Association International (BOMA). BOMA has created the standard method for measuring floor area in office buildings, which was approved by the American National Standards Institute, Inc. on Jun. 7, 1996. These standards are accepted as the basis for measuring the usable and rentable square feet in office buildings. The rentable square footage thus determined is entered in field 52 of FIG. 4.

In addition, during the survey or drawing review, the dimensions of a typical column for the space are determined as well as the number of columns on each floor. These values are entered into fields 54 and 56 of the screen of FIG. 4, respectively. Even if the columns are round, they are assumed to be squared with the length and width of the columns equal to their diameters.

The "dominant face" of the building is made up of the vertical structures which make up the largest portion of the building side walls. If the building is a square or rectangle, the building depth and width (measured from the exterior surfaces of the dominant faces) are entered in fields 58 and 62. If the building is not square or rectangular, the number of sides is entered in field 63 and the width of each side of the dominant face is entered in fields 64. The number of duplicate sides are entered in fields 65 to limit the number of side widths that must be entered in fields 64. If any of the sides of the dominant face features a curve, the angle and arc radius of the side is indicated in fields 66 and 68, respectively. If any of the sides of the dominant face are joined by angles other than 90°, the angles are entered into fields 66 (the angle between sides 1 and 2 is entered under the column for Side 1, the angle between sides 2 and 3 is entered under the column for Side 2, etc.). Field 69 is used to indicate that the side is curved or is at an angle other than 90° with respect to the neighboring wall in the order entered in fields 64. It should be noted that computer aided design software programs allow building measurement using shortcuts that return substantially the same calculation results without the need to enter each separate result into a table for further calculation.

If the perimeter of a floor is encumbered, such as by HVAC units or the like, the average distance from the dominant faces to the usable floor space is entered in field 72 and the percentage of the perimeter of the floor that is encumbered is also determined and entered in field 74. Also, the areas of losses due to water columns, private stair wells, angled column supports or other unusual losses are obtained and entered into fields 76.

Once the required data and information is gathered for a building space, five losses are calculated, as indicated by blocks 82, 84, 86, 88 and 92 of FIG. 3, and added together to obtain the building's net inefficiency (block 94). The building inefficiency factors are then calculated (block 96).

As illustrated in FIG. 3, block 82, the first loss calculated is the inaccurate measurement loss. The inaccurate measurement loss is imply the difference between the landlord or property management's stated rentable square footage (field 44 in FIG. 4), and the rentable square footage calculated using BOMA standards (field 52 in FIG. 4).

The second loss is the column loss, calculated at block 84 in FIG. 3. The column loss is the loss in space due to the support columns encumbering the space. The column loss thus equals the area of a typical column (obtained by multiplying the dimensions of fields 54 of FIG. 4) multiplied by the number of columns (entered in field 56).

The third loss calculated is the unusual building shape loss, as indicated at block 86 in FIG. 3. If the building floor area is square or rectangular, there is no building shape loss. If the building floor area is not a square or rectangle, there is a building shape loss associated with each building side that is not flat. The equation used to calculate the building loss is selected based on whether the building features angled or curved side walls.

Figure 5:
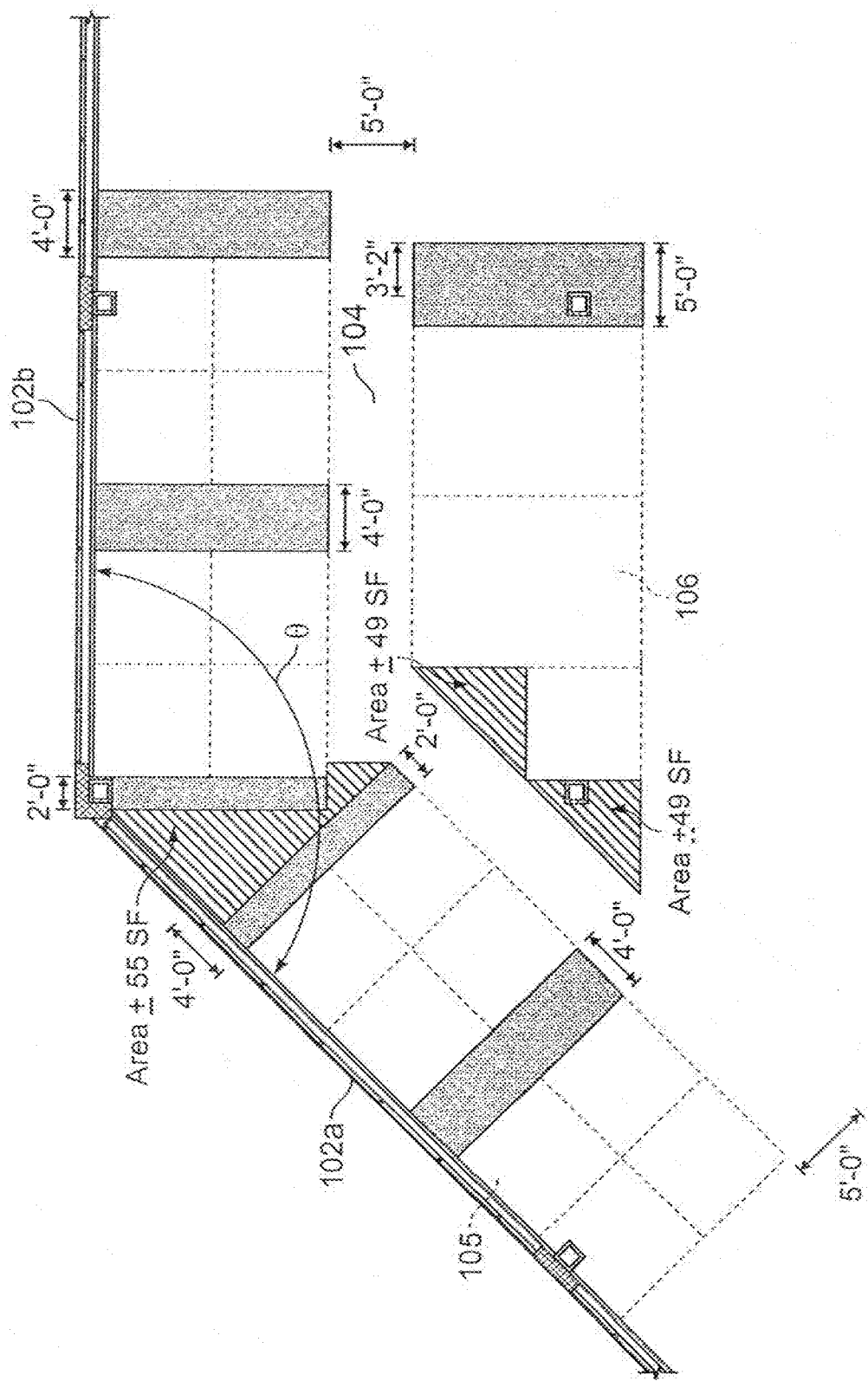
FIG. 5 is a plan view of a portion of a floor space of a building having walls forming an angle other than 90° illustrating why buildings with angles other than 90° create inefficiency losses when trying to lay out workstations.

If the building features angled side walls (walls at angles other than 90°), as illustrated in general at 102a and 102b in FIG. 5, a 50/50 mix of offices and workstations is taken into account by considering one side of the aisle, 104 in FIG. 5, as being workstations 105 and the other side being offices 106. The standard cubicle width by cubicle depth is assumed to be 7' by 7' while the standard office width by office depth is assumed to be 10' by 15'. The inside angle, θ in FIG. 5, is measured and the following formula is applied for each unique angle θ:

$$BSL = ((OD^2)/TAN((\Theta * CONPI/180)/2)*2)*D$$

Where:
BSL=building shape loss
OD=office depth (Default=15')
Θ=inside angle between angled walls (Field 66 of FIG. 4)
CONPI=3.14159265359
D=number of duplicate angles The building shape losses for the sides calculated using the above formula are then added to obtain the total building shape loss due to angled sides. The above formula, however, is only used when the two walls that make up the angle are each at least 25 feet in length, including before a next angle. In the event that either or both of the walls fail to meet this condition, the loss is measured by hand and entered as an "unusual loss" (block 92 in FIG. 3). The hand measurement is performed by measuring the area that would be taken up if the irregular angle were squared (i.e. instead of two walls forming an irregular angle, there, were three walls forming two 90 degree angles).

Figure 6:
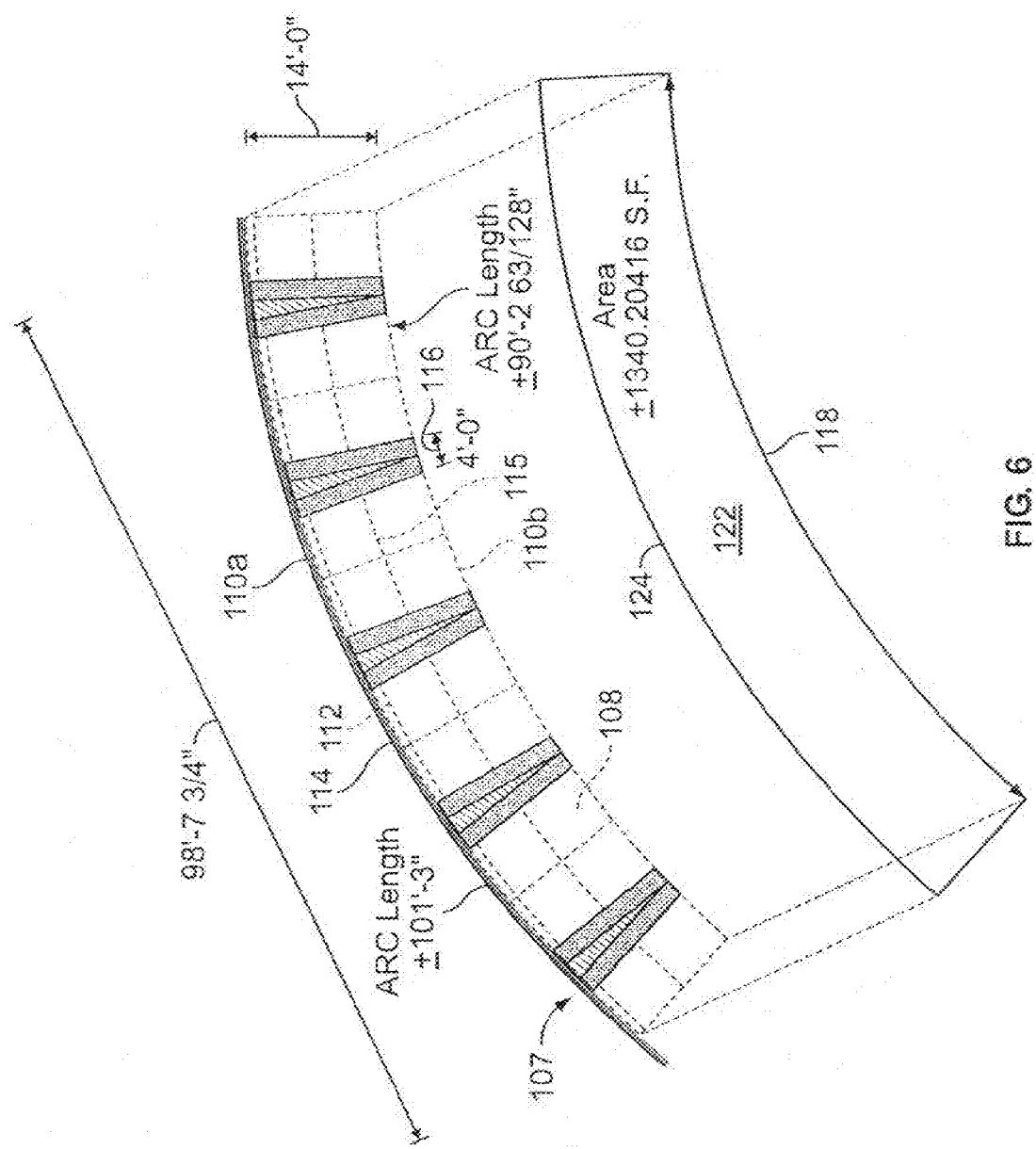
FIG. 6 is a plan view of a portion of a floor space of a building having a curved wall illustrating why buildings that have a curved building side create inefficiency losses when trying to lay out workstations.

If the building possesses curved side walls, as indicated in general at 107 in FIG. 6, a formula is used that calculates the loss based on the number of workstations in 14'×14' groups of four (indicated in phantom at 108 in FIG. 6) and number of 10'×15' offices that would fit between upper and lower arcs, illustrated at 110a and 110b, respectively, in FIG. 6. In the formula, which is presented below, the segment height, which is the distance between the workstation or office wall indicated at 112 in FIG. 6 and the peak 114 of the section of arc opposing that wall, is calculated and added to the depth of two workstations or one office. In addition, the width of two workstations (115 in FIG. 6) and one aisle (116 in FIG. 6) or one office width (no aisle for accessing the inner workstations required) is divided into the length of the lower arc, indicated at 118 in FIG. 6. Since offices can be adjusted to fit exactly in the area defined between the upper and lower arcs (122 in FIG. 6), no further fit calculations are done for offices.

Since workstations must fit at least one cubicle width and an aisle width within the area 122 of FIG. 6, however, additional fit calculations are done. More specifically, if one more workstation group of four would fit if there were six more inches, another group is added to the result. If not, another calculation is done to see if one workstation width and an aisle would fit. If so, one workstation width and aisle is added to the result. If not, workstations are spread evenly over the length of the arc.

The square footage of the workstation groupings that would fit squarely between the arcs is calculated and subtracted from the total area between the arcs, indicated at 122 in FIG. 6. The square footage of offices that would fit squarely between the arcs is also calculated and subtracted from the total area between the arcs. The remaining square footage for each calculation is added and the total is multiplied by the number of duplicated sides to obtain the total building shape loss due to curved sides.

The following formula reflects the above logic and considerations and may be used for calculating the building shape loss if the building features one or more curved side walls:

$\Theta = (2 * CW)/(2 * s)$
$\Theta o = OW/(2 * s)$
Where: $\Theta$ = measure in radians of the central angle subtending the arc for workstations
$\Theta o$ = same as above for offices
$CW$ = width of cubicle or workstation (default = 7')
$OW$ = width of office (default = 10')
$s$ = radius of the arc
'DERIVED ARCSIN FUNCTION FOR WS (WORKSTATION) AND OFFICE
$ARCSIN = ATN(\Theta/SQR(-\Theta * \Theta + 1))$
$ARCSINO = ATN(\Theta o/SQR(-\Theta o * \Theta o + 1))$
Where: $ATN$ = arctangent
$SQR$ = square root
'CALCULATE WS AND OFFICE SEGMENT HEIGHT
$SH = s - (s * COS (ARCSIN))$
$SHO = s - (s * COS(ARCSINO))$
Where: $SH$ = segment height for workstations
$SHO$ = segment height for offices
'RADIUS LESS WS OR OFFICE AND SEGMENT HEIGHT DEPTHS
$R2 = s - ((CD * 2) + SH)$
$R2O = s - (OD + SHO)$
Where: $R2$ = radius of arc less height for two workstations and segment height
$R2O$ = radius of arc less office height and segment height
$CD$ = cubicle or workstation depth (default = 7')
$OD$ = office depth (default = 15')
'ARC LENGTH AVAILABLE FOR WORKSTATIONS OR OFFICES
$SA2 = R2 * A * CONPI/180$
$SA2O = R2O * A * CONPI/180$
Where: $SA2$ = arc length (arc at bottom of workstations)
$SA2O$ = arc length (arc at bottom of offices)
$CONPI$ = 3.14159265359
$A$ = central angle of the circle whose upper boundary is the arc
'TWO WS WIDTH AND AISLE WIDTH
$TWOCWAW = CW * 2 + CONAW$
Where: $TWOCWAW$ = two workstation or cubicle widths and an aisle width
$CONAW$ = aisle width (default = 4')
'TWO WS DEPTH AND SEGMENT HEIGHT AND OFFICE DEPTH
$TWOCDSH = CD * 2 + SH$
$OFDSH = OD + SHO$
Where: $TWOCDSH$ = two workstation or cubicle depths and segment height
$OFDSH$ = office depth and segment height
'HOW MANY WSs FIT?
IF $INT((SA2 + 0.5)/TWOCWAW) - INT(SA2/TWOCWAW) <> 1$ THEN
Where: $INT$ = returns integer portion of a number
'IF ADDITIONAL SIX INCHES WILL NOT FIT ADDITIONAL WS
$WSFIT = SA2/TWOCWAW$
Where $WSFIT$ = total square footage of workstations or cubicles that fit
'PERCENT OF WS THAT WILL FIT
$REMAINDER = (WSFIT - INT(WSFIT)) * TWOCWAW$
'CALCULATE SQ. FOOTAGE WITH ONE WS AND AISLE IF THERE IS ENOUGH ROOM
    IF $REMAINDER >= CW + CONAW$ THEN
        $WSFIT = ((INT(WSFIT) * TWOCWAW) + (CW + CONAW)) * TWOCDSH$
    ELSE
        'OTHERWISE, CALCULATE SQUARE FOOTAGE
        $WSFIT = INT(WSFIT) * TWOCWAW * TWOCDSH$
    END IF
ELSE
'NUDGE ADDITIONAL WS GROUP INTO ARC IF ONLY 6" OR LESS NEEDED
    $WSFIT = INT((SA2 + 0.5)/TWOCWAW) * TWOCWAW * TWOCDSH$
END IF
'SQUARE FOOTAGE OF OFFICEs?
$OFFIT = SA2O * (OD + SHO)$
Where: $OFFIT$ = total square footage of offices that fit
'TOTAL WS LOSS
$WSTOT = (A/360 * ((CONPI * (S\char`^2)) - (CONPI * (R2\char`^2)))) - WSFIT$
'TOTAL OFFICE LOSS
$OFTOT = (A/360 * ((CONPI * (S\char`^2)) - (CONPI * (R2O\char`^2)))) - OFFIT$
'CALCULATE TOTAL LOSS TIMES THE NUMBER OF DUPLICATED SIDES
$BSL = (WSTOT + OFTOT) * D$ -continued Where: BSL = Building Shape Loss
D = Number of Duplicate Sides (Fields 65 of FIG. 4)

Next, as illustrated by block 88 in FIG. 3, the window line encumbrance loss is calculated. This loss takes into account situations where the perimeter of a floor is encumbered, such as by HVAC units or the like. The window line encumbrance loss is calculated by taking the horizontal distance from the dominant face to the usable space (from field 72 in FIG. 4) and multiplying it by the perimeter of the building (determined using fields 58 and 62 or 64 and 65 of FIG. 4).

Occasionally, there are space area losses on a floor that do not fit into any of the standard formulas above, which are calculated as indicated by block 92 of FIG. 3. In addition to the irregular angle loss described above, such losses may include unusual shaft penetrations, columns that run diagonally through the space (taking up more usable square feet) and leftover stairwells from previous tenants connecting two leased floors. Any irregular angle which fails to meet the conditions specified in the paragraph above regarding angled side walls and FIG. 5, is hand-measured and also included as an unusual loss. These are not required to be deducted by BOMA standards, and are considered unusual losses. These losses are measured, input in fields 76 of FIG. 4 and used as actual square foot losses, as opposed to being calculated by formulas.

Once the five losses of blocks 82-92 of FIG. 3 are calculated or otherwise determined, they are used to calculate the net inefficiency for the space, as indicated by block 94 of FIG. 3. The net inefficiency is calculated by first adding the five losses of blocks 82-92 of FIG. 3 and then establishing a ratio between those losses and the landlord's stated rentable square feet (from field 44 of FIG. 4).

As illustrated in block 96 of FIG. 3, once the net inefficiency is calculated, the single tenant inefficiency factor and the multi-tenant inefficiency factor are calculated using the following formulas and the building single tenant loss factor (from field 46a of FIG. 4) and the building multi-tenant loss factor (from field 46b of FIG. 4):

SINGLE TENANT INEFFICIENCY FACTOR=[(1+
NET INEFFICIENCY)*(1+BUILDING
SINGLE TENANT LOSS FACTOR)]−1

MULTI-TENANT INEFFICIENCY FACTOR=[(1+
NET INEFFICIENCY)*(1+BUILDING MULTI-
TENANT LOSS FACTOR)]−1

As will be illustrated below, the pure space is multiplied by the appropriate inefficiency factor to provide an inefficiency add-on. The single tenant inefficiency factor is used when the space in question occupies the entire floor of a building so that the tenant is the sole tenant of the floor. The multi-tenant inefficiency factor is used if the space in question is only a portion of the building floor so that the tenant shares the floor with another tenant or tenants.

An example of a report page produced by and in accordance with embodiments of the system and method and illustrating a calculation of the single and multi-tenant inefficiency factors performed in accordance with FIG. 3 and the above description is presented in FIG. 7.

An example using circulation factors calculated in accordance with Phase 1 above and inefficiency factors calculated in accordance Phase 2 above is presented in Table 2.

TABLE 2

| Calculation of Required Space | | |
|---|---|---|
| Net usable square footage: | Simply the net square footage when all area requirements are added together (before circulation): | 10,500 |
| Circulation Factor: | The extra space required for aisle ways, ingress and egress calculated in Phase 1: | 1,575 |
| Pure space: | The sum of net usable square feet and circulation factor; also the space required in a perfectly efficient environment: | 12,075 |
| Building Inefficiency Factor: | The add on calculated in Phase 2 for loss attributable to building inefficiencies (assume single tenant for this example), multiply pure space by: | 17.5% |
| Total rentable square footage: | Total space that should be required to lay out the given requirements in this particular building: | 14,188 |

In all alternative embodiment of the system and method described above, use of a landlord's loss factor (single tenant or multi-tenant) is avoided in calculating the total rentable square footage. Such an approach is desirable when there is concern that landlords are either not calculating their loss factors correctly according to BOMA standards or are misrepresenting their loss factors in an attempt to have their buildings' efficiency represented favorably. In such an alternative embodiment of the system and method, instead of calculating the net inefficiency for a space and multiplying that number by the landlord's loss factor, the actual usable square footage of the space is measured. This may be easily accomplished in situations where a draftsman has a computer aided design (CAD) file of the space. Next, the efficiency losses from blocks 84-92 of FIG. 3 are subtracted from the measured usable square footage to provide the net usable square footage assuming both a single tenant floor and multi-tenant floor. An efficiency ratio is next calculated by dividing the landlord's stated rentable square footage (from field 44 of FIG. 4) by the net usable square footage for both a single tenant floor and multi tenant floor to arrive at efficiency ratios of the two different users. The resulting efficiency ratios may be multiplied by the pure space to obtain the projected rentable area that will be required for the tenant's space requirements ("Total rentable square footage" in Table 2 above). An example screen from this embodiment of the system and method showing the calculation of the efficiency ratio for both single and multi-tenant situations is provided in FIG. 8.

An example of another report page produced by and in accordance with embodiments of the system and method is presented in FIG. 9. The circulation factor is presented at 132 while the inefficiency factor is presented in field 134. Prior to production of this report, the user has entered whether the single tenant or multi-tenant situation applies and the specific loss factors of the building in question.

The circulation factors, inefficiency factors and related calculations provided by the system and method may be used by real estate firms to assist clients in determining appropriate rentable areas required or to identify inefficiencies in space plans or programs prepared by outside architects and planners. In addition, the system and method may be used by purchasers of office buildings for analyzing the relative efficiency and potential marketability of an office building. The system and method may also be used by the architectural/design industry to project the appropriate amounts of space for their client.

Using an embodiment of the system and method of the present invention, the amount of space a tenant or user of office space should require, given an accurate requirement program, an efficient building and an efficient space program, is calculated. Once established, this efficient space projection can be compared to the user's existing or original space and the total amount of space inefficiencies can be calculated.

Additionally, the total inefficiencies can be broken down so that the user can understand not only where the inefficiencies are coming from but how much space inefficiency is attributable to each area. A report is produced that presents this information to the user in a clear and concise format.

The areas of inefficiency, or inefficiency measures, are broken down into three categories. The first category is losses from obsolescence ("Programming Inefficiency"). These losses are areas in a user's space that are either too large or not needed. Examples of obsolescence include, but are not limited to: a filing area that may no longer be needed, a computer room that could be smaller due to miniaturization of processors and technology components, a work area that is larger than the company mandate for the employee in that work area, a library that is no longer needed due to electronic storage or any area that may be reduced for any assortment of reasons.

The second category is loss, from an inefficient building ("Building Inefficiency"). As described previously, each building contains characteristics that cause it to be more efficient or less efficient when laying out a user's requirements into the building. As described above, the total of all inefficiencies are calculated and used to determine a unique efficiency ratio for any particular building. The building efficiency ratios for multiple buildings, when multiplied by the user's requirements and circulation area estimate, will help establish (within reason) the amount of space a user may require in each of the multiple buildings. The amount of additional space needed due to a building's high efficiency ratio is considered loss from building inefficiencies.

The third category is loss from inefficient space planning ("Space Plan Inefficiency"). This loss results from careless or inefficient layout of a user's requirements in a given space that requires more circulation area than should be necessary.

Operation of an embodiment of the system of the invention in accordance with all embodiment of the method of the invention will now be explained with reference to FIGS. 10 through 33. As will be explained in greater detail below, the screens of FIGS. 10 through 33 are presented to a user via the display of a computer work station or the like.

The user logs onto the system using the screen of FIG. 10 by entering his or her Username and Password in fields 138 and 140, respectively. The screen of FIG. 11 is then displayed.

In accordance with the invention, the user (or professional assisting the user) first creates a list of the areas in the user's current or original office space (a "space program"). The invention more likely will be used at the end of a user's lease than at the beginning of the user's lease. Since typical office leases generally run five to ten years (and holding periods for purchased buildings ten years and more), it is advantageous to take a fresh look at the program requirements of the user to make sure their program requirements have not changed over the lease or holding period.

Data regarding the user's office space, including space programs, is stored on the system under the user's company name. The company names that have been entered into the system will appear on the screen of FIG. 11. If the user wishes to enter information for a company that is not on the system, the company name must be entered. The user selects the New icon 142 to do so. Alternatively, if the company name already appears on the screen of FIG. 11, the user double-clicks on the appropriate line to select his or her company. The screen of FIG. 12 is displayed regardless if the icon 142 is pressed or the user double-clicks on the line featuring his or her company name.

Figure 12:
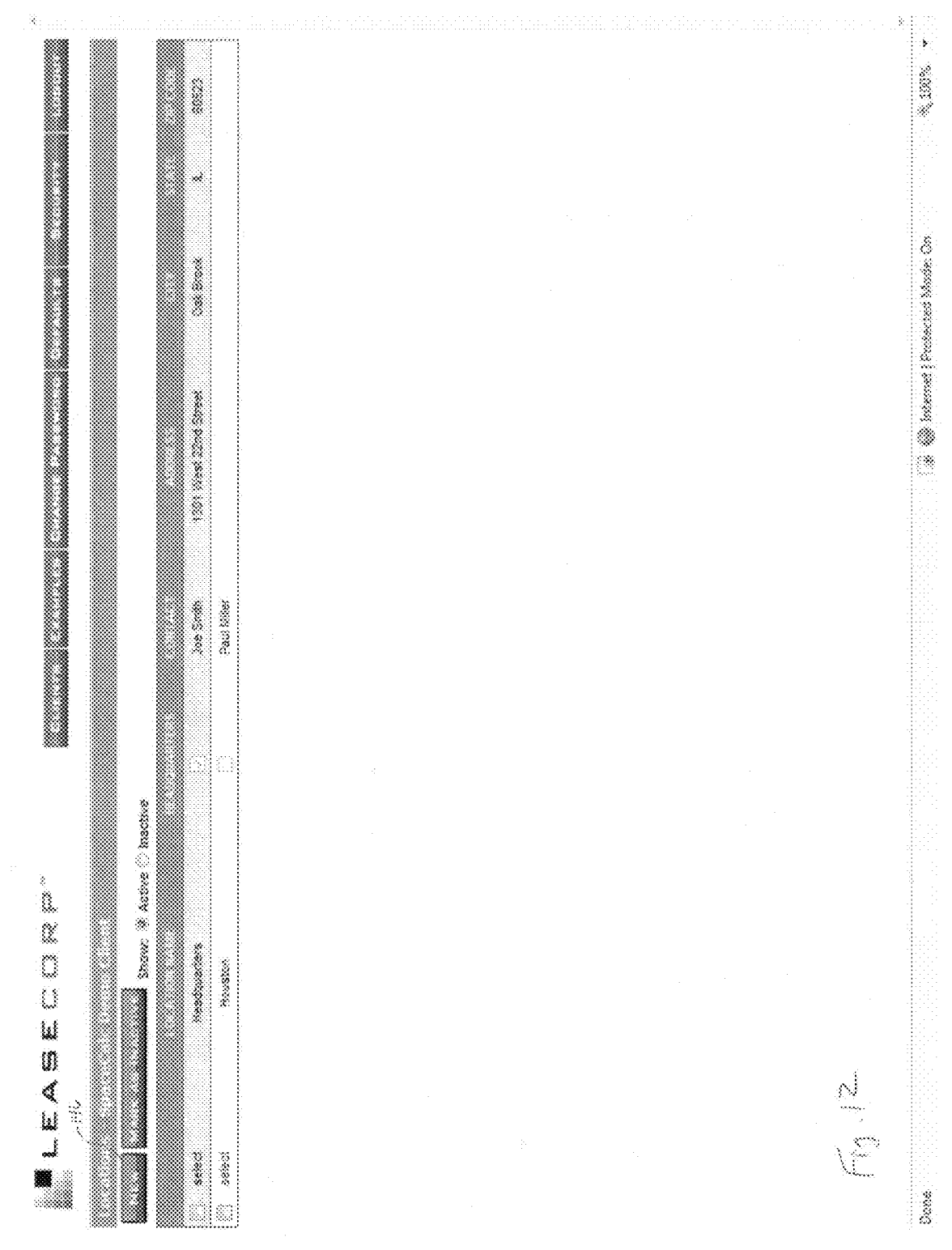

The screen of FIG. 12 displays the locations entered into the system for the company selected via the screen of FIG. 11. The user may enter new locations by selecting the New icon 146 or edit existing locations by double-clicking on the appropriate line in the screen of FIG. 12. If the user selected the New icon in FIG. 11, there will be no locations listed in FIG. 12, and the user must select New icon 146 to enter the location information.

Figure 13:
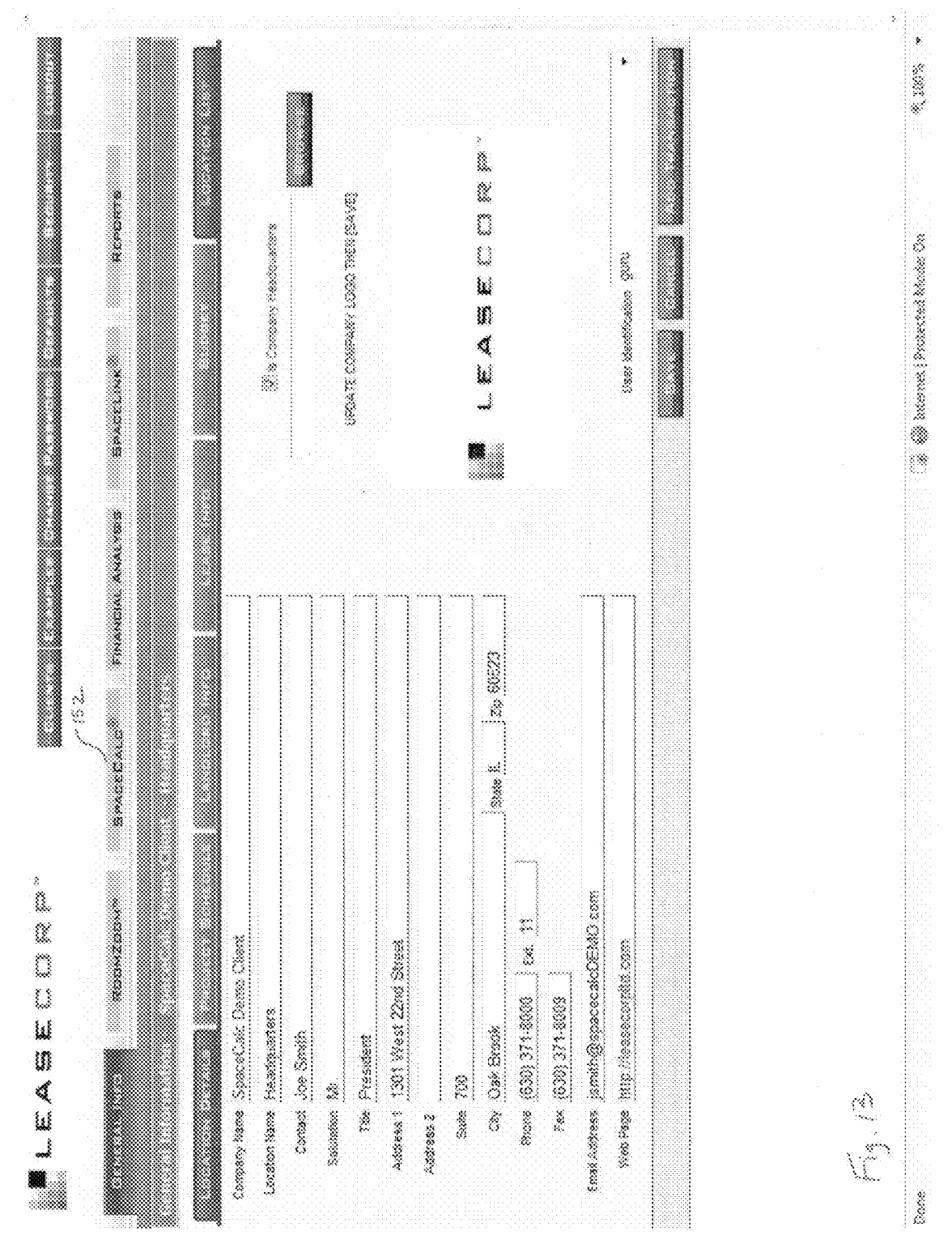

FIG. 12 assumes that the Company Name, "SpaceCalc Demo Client" was listed in FIG. 11 and that the locations of FIG. 12 have been entered for that client. The user selects the location of interest by double-clicking on the appropriate line. As an example, the user double-clicks on the first line of the screen of FIG. 12 which lists "Headquarters" as the Location Name. As a result, the screen of FIG. 13 is presented to the user and displays the name of the contact for the location selected in the screen of FIG. 12, his or her address, telephone numbers and e-mail address. The contact information is entered into the system via the screen of FIG. 13 if the New location icon 146 has been selected from the screen of FIG. 12.

Once the location information has been entered into the system or confirmed, the user is ready to create the current space program for the location. In order to do so, the user selects the SPACECALC tab 152 in the screen of FIG. 13. This results in the screen of FIG. 14 being displayed. The screen of FIG. 14 lists the space programs that have previously been created for the location (if any). The user selects the New icon 154 to create a new space program for the location, and the screen of FIG. 15 is displayed.

Figure 15:
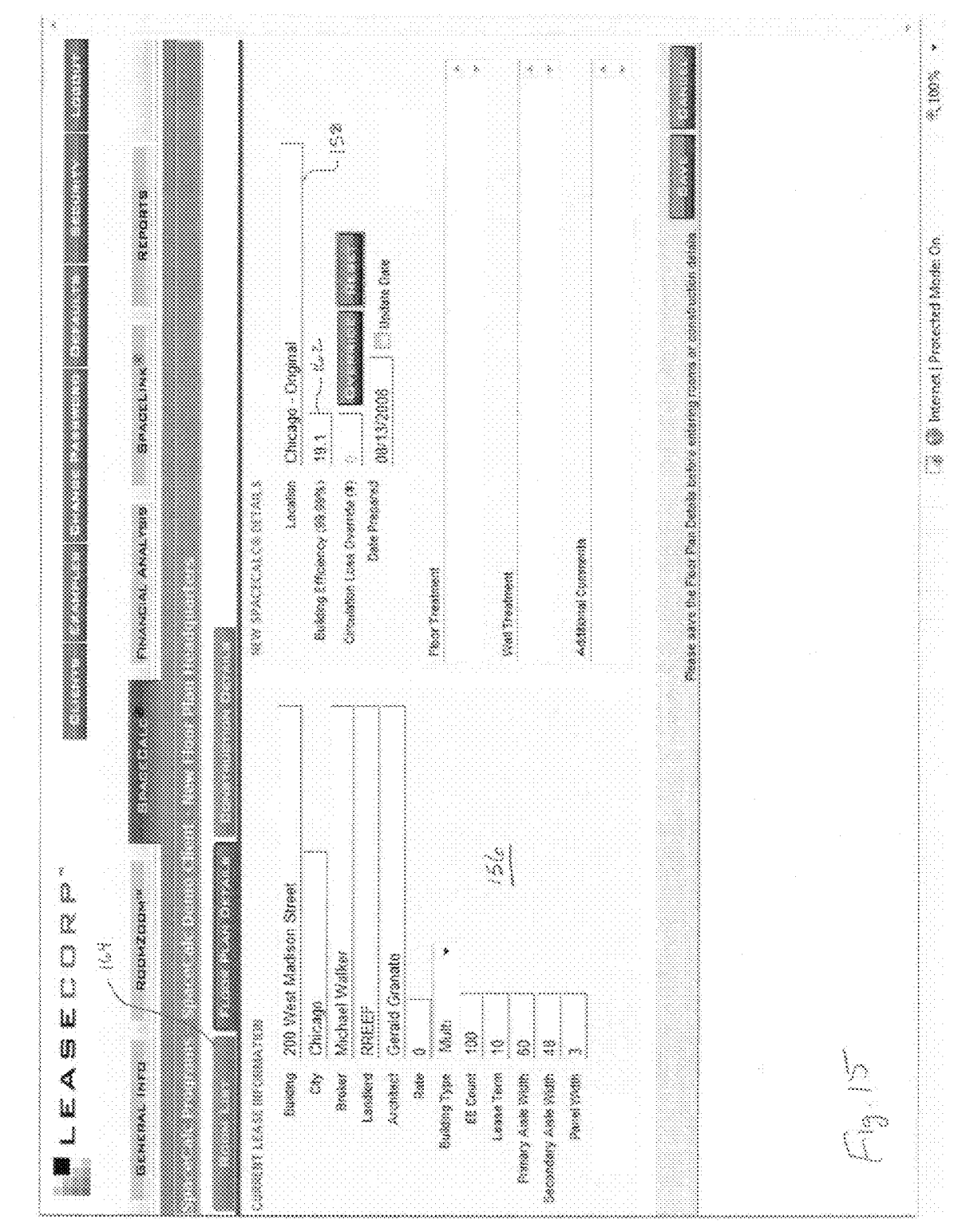

The user enters the current building address for the location and current lease information in the fields of section 156 of the screen of FIG. 15. The user enters the name of the new space program in the field 158 of FIG. 15, as well as the building inefficiency factor in field 162, which serves as an efficiency measure. The building inefficiency factor may be calculated using the approach described above (under "Phase 2: Determining Building Inefficiency Factors"). Alternatively, the efficiency ratio described above with respect to FIG. 8 may be converted to an inefficiency factor by subtracting one and converting the resulting decimal to a percentage. For example, the efficiency ratio of FIG. 8 of 1.24 equals an inefficiency factor of 24%. As another alternative, a default inefficiency factor of 20% may be used if the inefficiency factor for the building is not known. In the example illustrated in FIG. 15, the inefficiency factor is known to be 19.1, and this value is entered into field 162.

Figure 16:
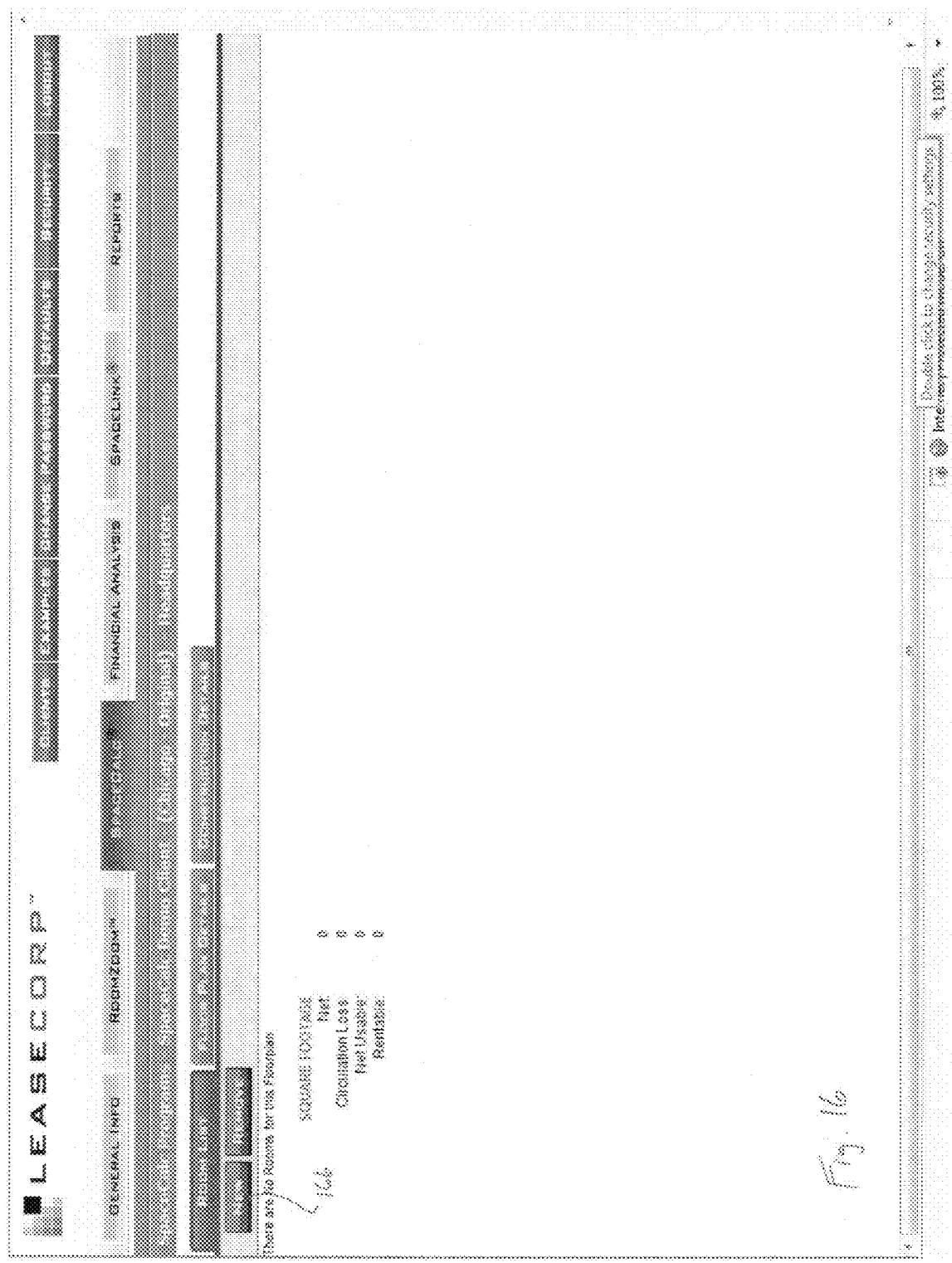

The user selects the Room List tab 164 of FIG. 15 to begin creating and entering rooms for the new space program so that it reflects the exact use of the tenant's current space. As an example, if the user currently has ten (10) 8'×8' cubicles in their space and intends to reduce them to eight (8) 6'×6' cubicles for their next office, the user would enter ten (10) 8'×8' cubicles. This is clone so an efficiency comparison can later be completed. The screen of FIG. 16 is displayed, and the user selects the New icon 166. The screen of FIG. 17 is then displayed.

The user begins entry of data for a room of the space program by selecting the type of room from the Room Type pull down menu 168 of the screen of FIG. 17. The user next selects the size of the room using the Size pull down menu illustrated at 172 in FIG. 18.

Figure 20:
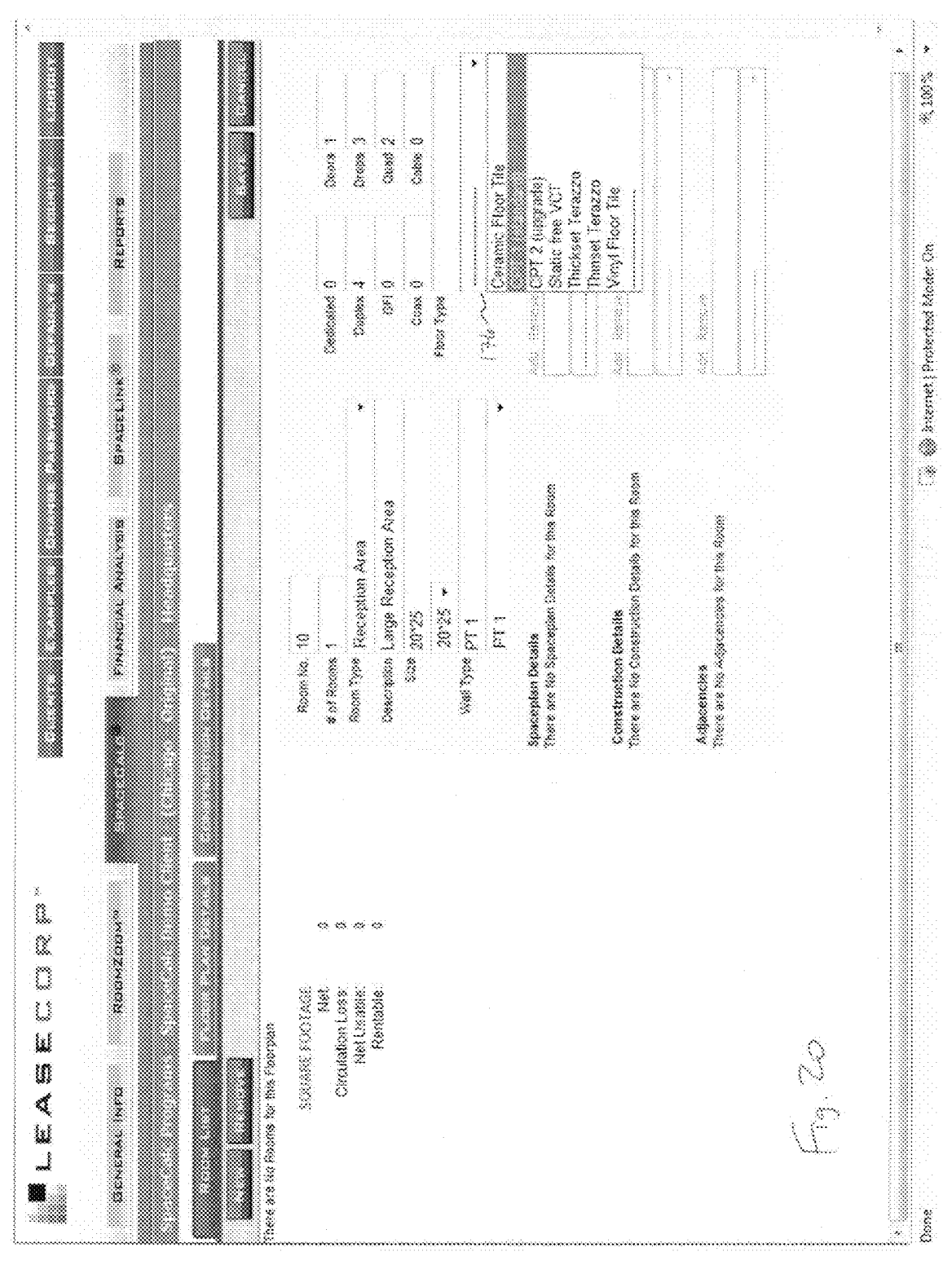

The desired finish of the room walls is selected via the Wall Type pull down menu 174 of FIG. 19. In the pull down menu 174 of FIG. 19, "PT" is the abbreviation for "paint type" while "VWC" is the abbreviation for "vinyl wall covering." The Floor Type pull down menu 176 of FIG. 20 is used to select the floor surface. In the pull down menu 176 of FIG. 20, "CPT" is the abbreviation for "carpet."

Figure 21:
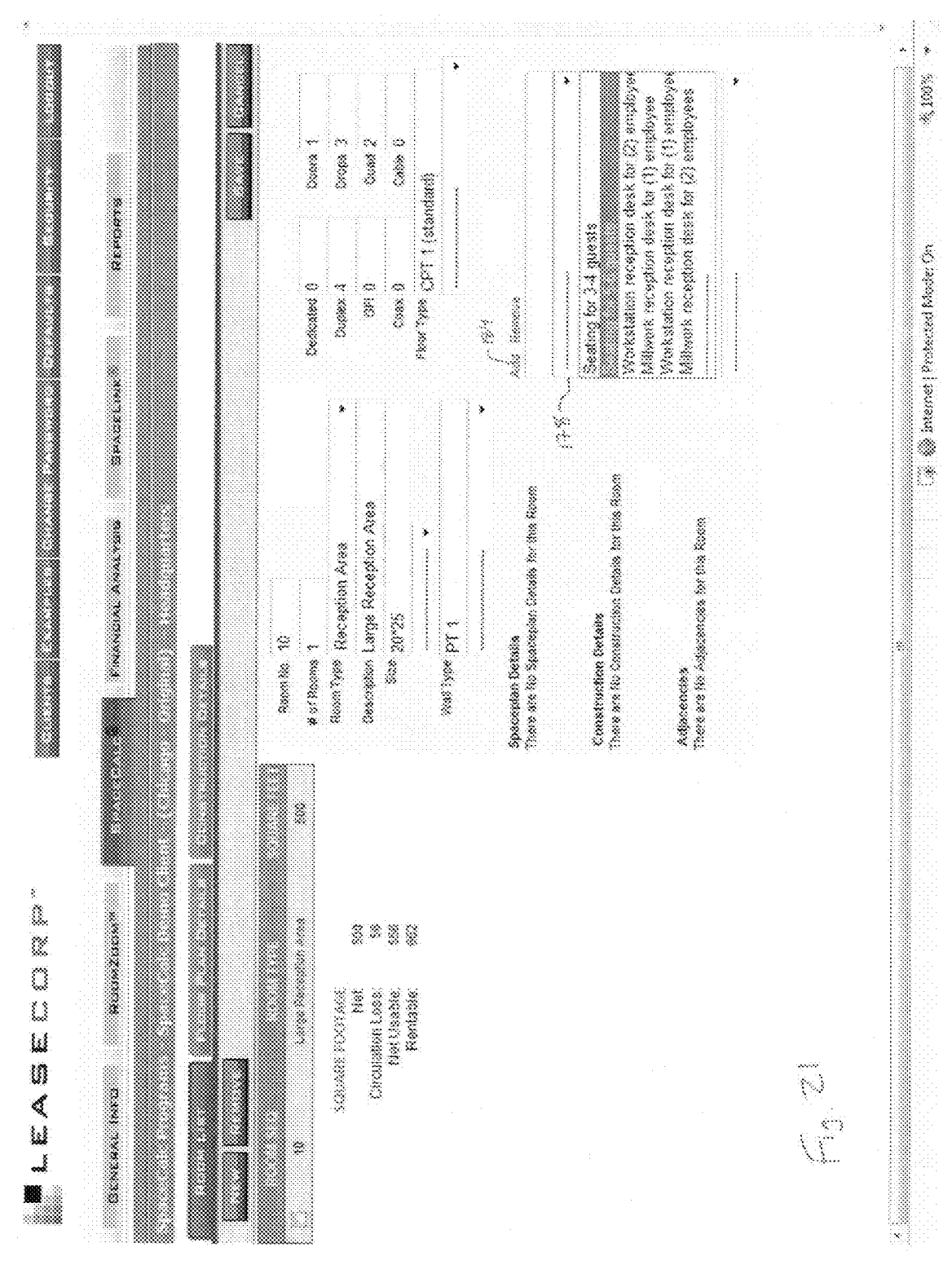
Figure 22:
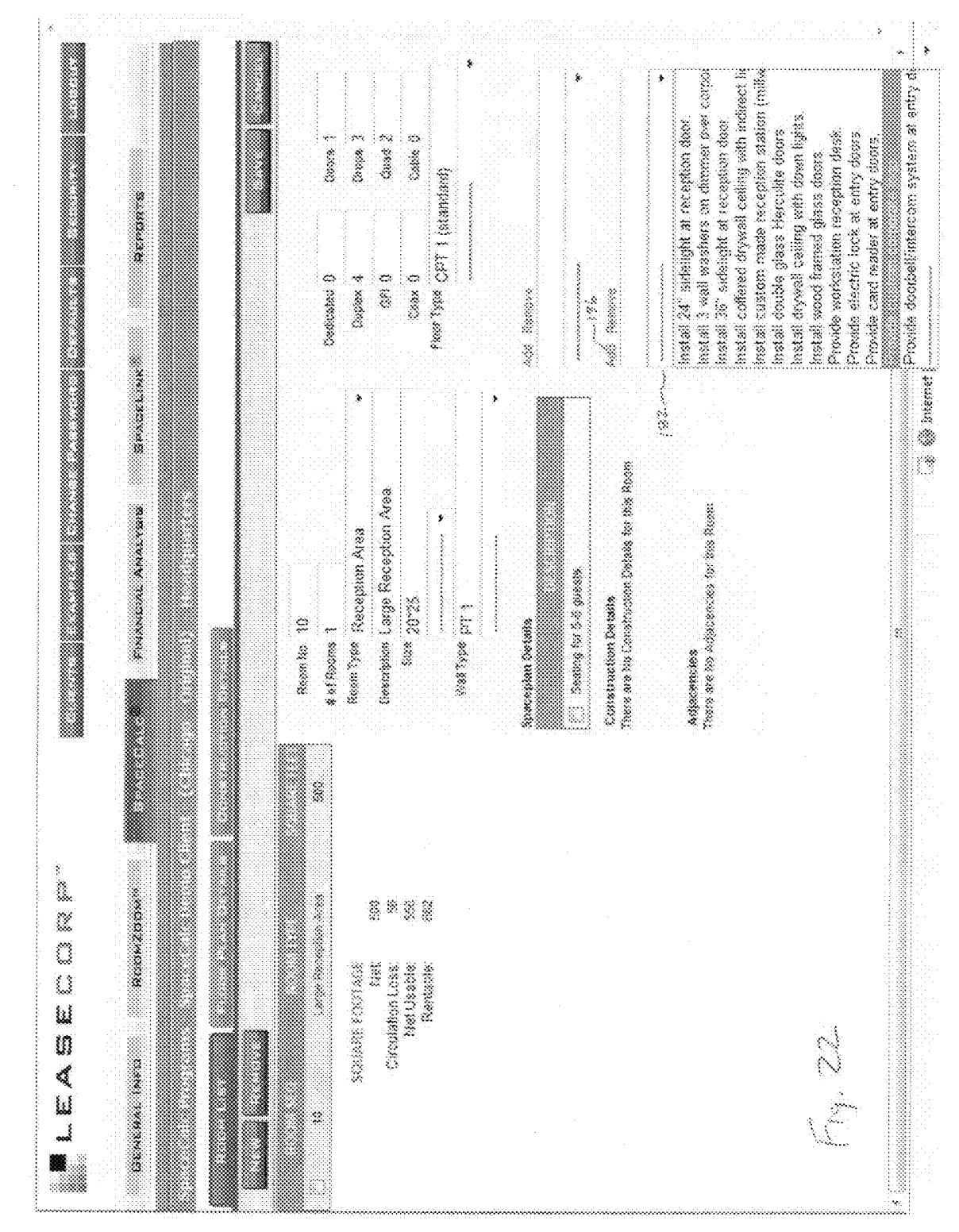

Additional details and construction details for the room are provided via the Spaceplan Details pull down menu illustrated at 178 in FIG. 21 and the Construction Details pull down menu illustrated at 182 in FIG. 22, respectively. The user selects the Add icons 184 of FIG. 21 and 186 of FIG. 22 to save the Spaceplan and Construction Details selected with the pull down menus.

When the user is ready to add another room to the space program, he or she repeats the process illustrated in FIGS. 16 through 22, beginning with the selection of the New icon 166 of FIG. 16.

Figure 23:
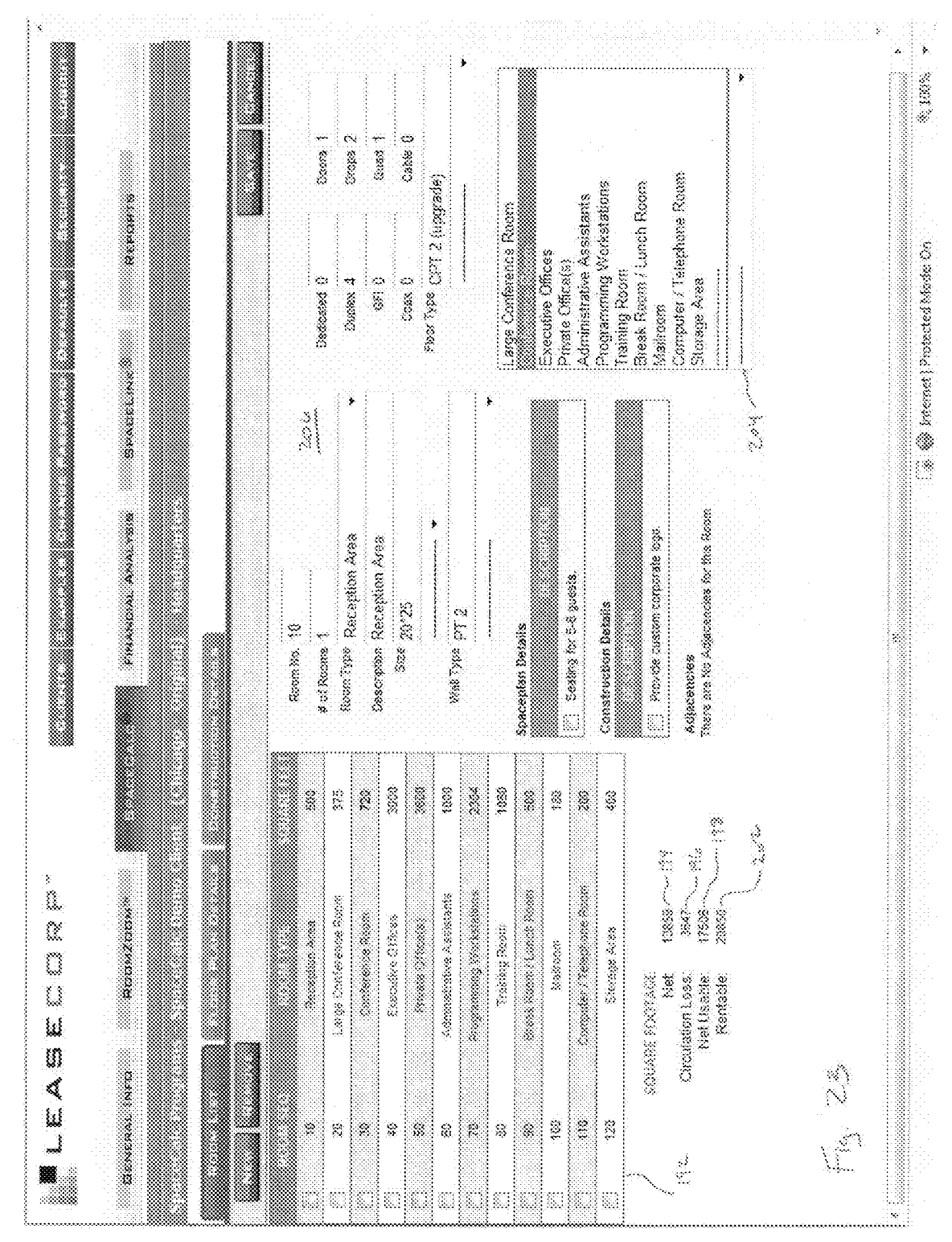

The user continues to add rooms until the space program is completed, as illustrated in table 192 in FIG. 23. The net total square footage of the space program (which should reflect the exact net square footage currently in the tenant's space) is automatically added and presented in Net field 194 of FIG. 23. The system preferably uses the method described above (under "Phase 1: Circulation Factor Calculation") to calculate a circulation loss for the space program. This circulation loss is presented in field 196 of the screen of FIG. 23. Fields 194 and 196 are added to provide the Net Usable space, field 198 of FIG. 23. As described above with reference to Table 2, the Net Usable space is multiplied by the Building Efficiency (inefficiency factor) entered in field 162 of FIG. 15 in decimal form and the result is added to the Net Usable space to arrive at the Rentable space displayed in field 202 of FIG. 23. In the example presented in FIG. 23, the inefficiency factor is 19.1% which, when multiplied by the Net Usable amount of 17506 square foot gives a total of 3344 (rounded). Adding 3344 to 17506 (field 198) gives 20850 square foot (field 202).

Figure 24:
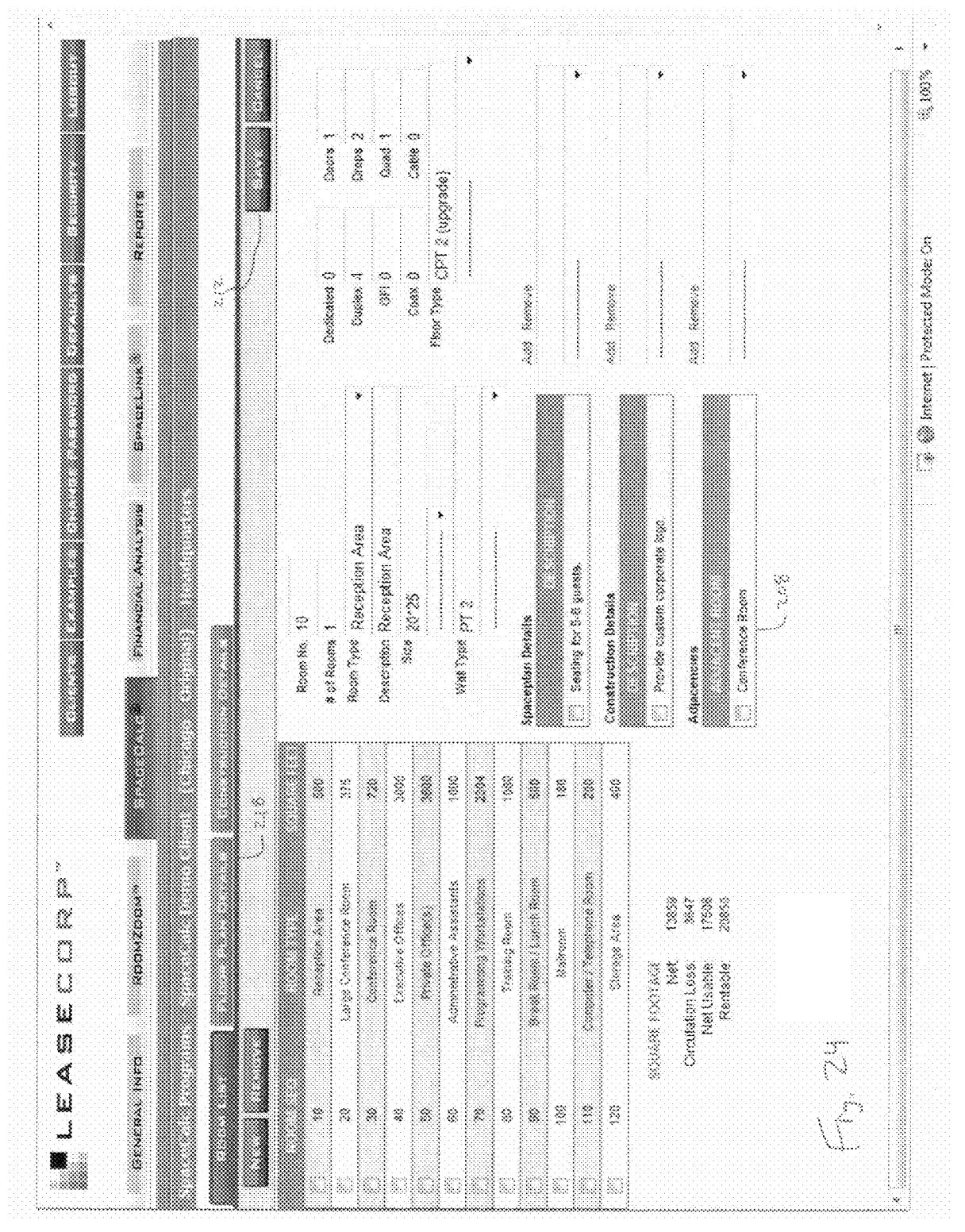

Adjacencies for the appropriate rooms of the space program may be added when the space program is complete. Adjacencies are basically the rooms that must be adjacent to a particular room. The adjacencies are entered via the Adjacencies pull down menu 204 illustrated in FIG. 23. With reference to FIGS. 23 and 24, the user has clicked on the Reception Area room in the space program 192, and the corresponding information for the Reception Area is displayed in portion 206 of the screen. The user has selected the Conference Room in Adjacencies pull down menu 204. As a result, the Conference Room is listed as an Adjacent Room for the Reception Area in field 208 of FIG. 24.

At this point, the user has created a space program that accurately reflects the use of net square feet and current building's efficiency ratio. Since the goal is to create an initial space program that reflects the exact use of the user's current/ original space so it later can be compared with a proposed, more efficient use of space, the user must adjust the circulation factor which at this point is representing an efficient lay out as calculated by the program. While the screen of FIG. 24 is displayed, the user clicks on the Floor Plan Details tab 218 so that the screen of FIG. 25 is displayed.

Figure 26:
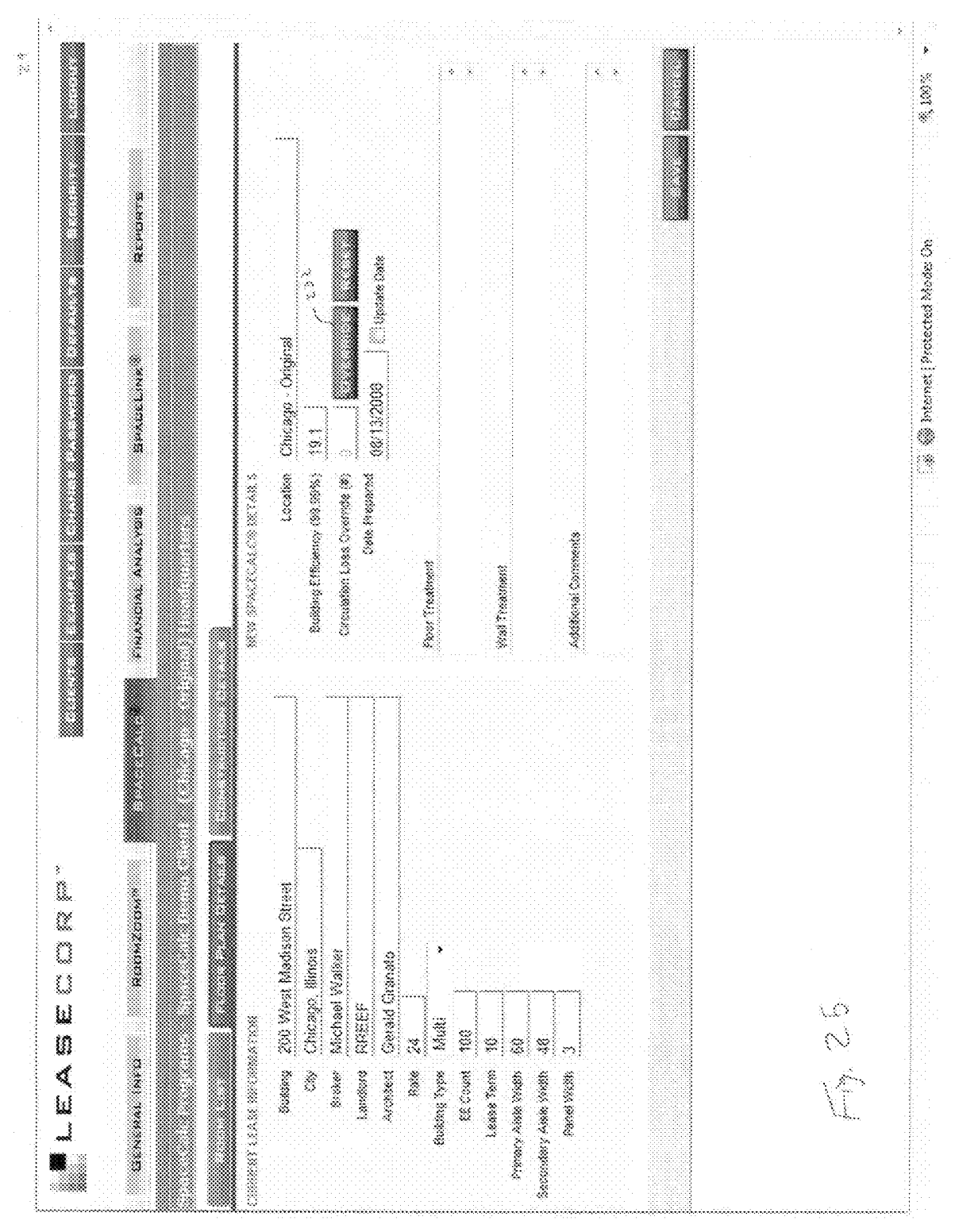
Figure 26:
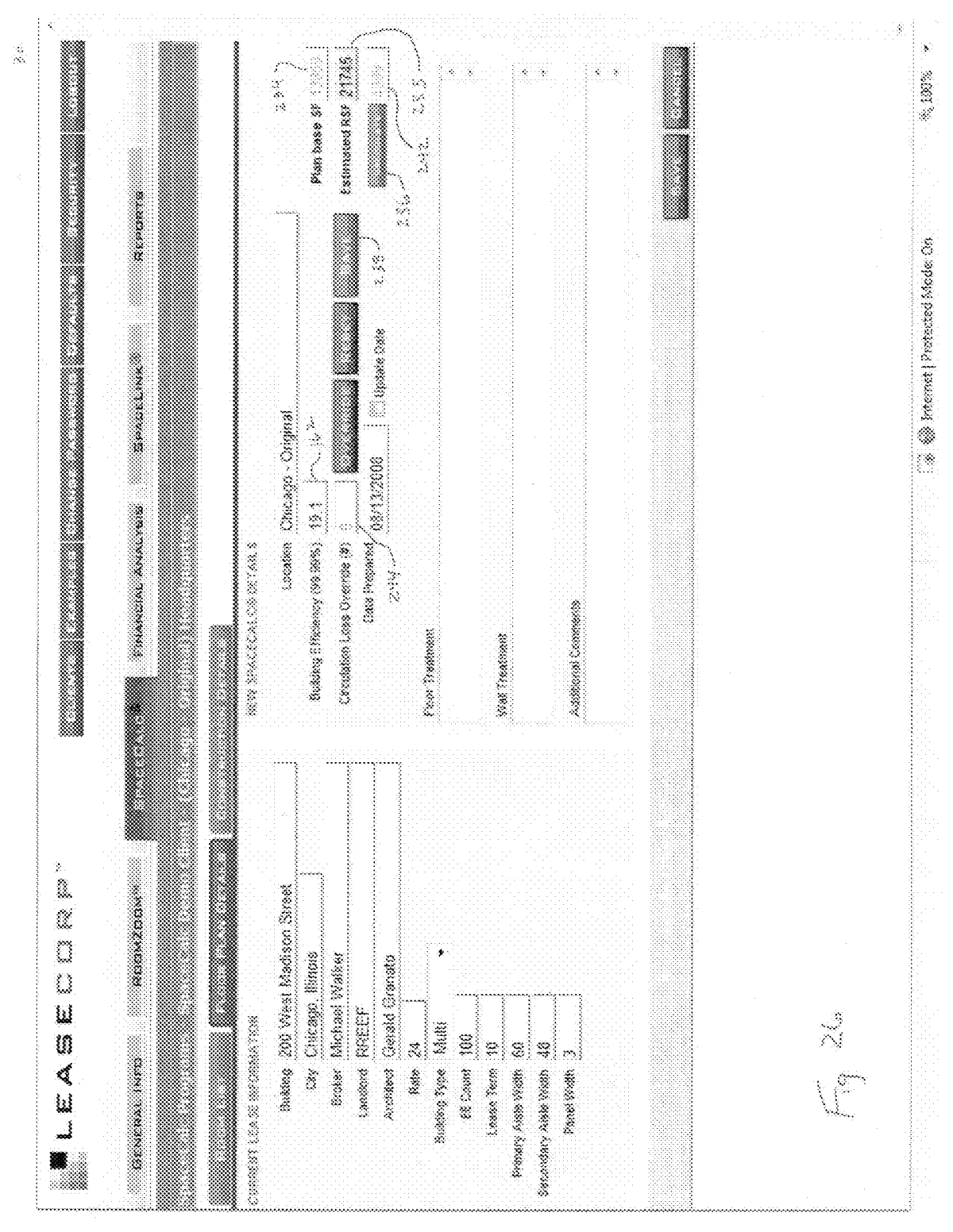

While viewing the screen of FIG. 25, the user selects the Override icon 232. As a result, the Plan base SF and Estimated RSF fields 234 and 235 of FIG. 26 are displayed. The net square footage from field 194 of FIG. 23 is automatically displayed in field 234 of FIG. 26. The Calculate and Save icons 236 and 238 of FIG. 26 are also displayed.

The user enters the total square footage of the currently leased space into the Estimated RSF field 235 of the screen of FIG. 26, clicks on the Calculate icon 236 and the actual circulation loss is calculated and displayed; in field 242 of FIG. 26. More specifically, since the total currently leased/ rentable square footage is known (entered into field 235 of FIG. 26), as well as the net space square foot requirements (field 234 in FIG. 26) and the building inefficiency factor or efficiency ratio (field 162 in FIGS. 15 and 26), the system solves for the missing circulation area amount using the following formula (using the data from FIG. 26):

Net square footage requirement (NSF): 13,859
Circulation loss/area (CA): X
Building inefficiency factor (IF)
In decimal form: 0.191 (19.1%)
Gross square footage (GSF): 21,745

Formula: CA=GSF/(1+IF)−NSF=4399 (displayed in field 242 of FIG. 30)

Figure 27:
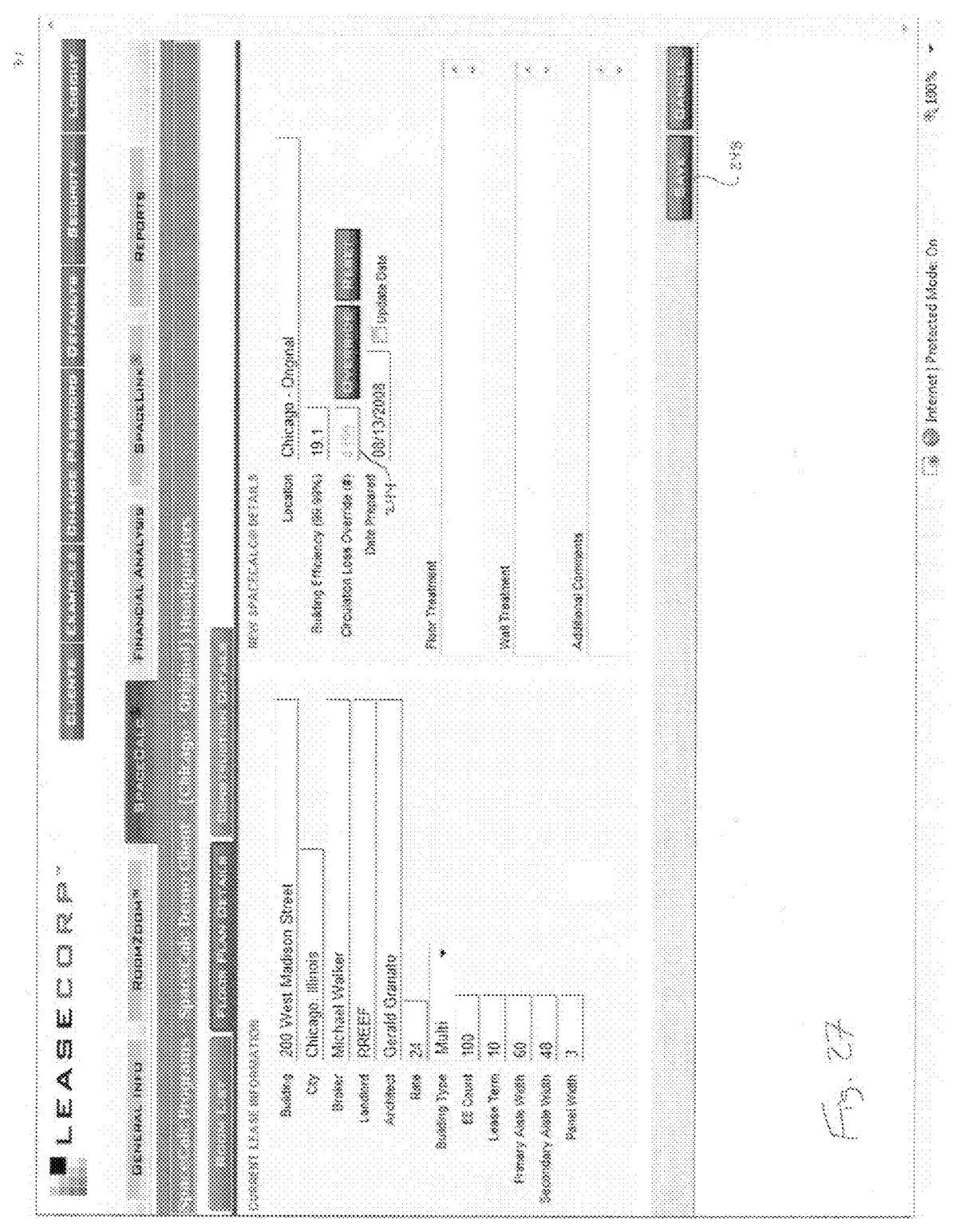

The user selects the Save icon 238 of FIG. 26 and the circulation loss/area of field 242 appears in the field 244, as illustrated in FIG. 27.

Figure 28:
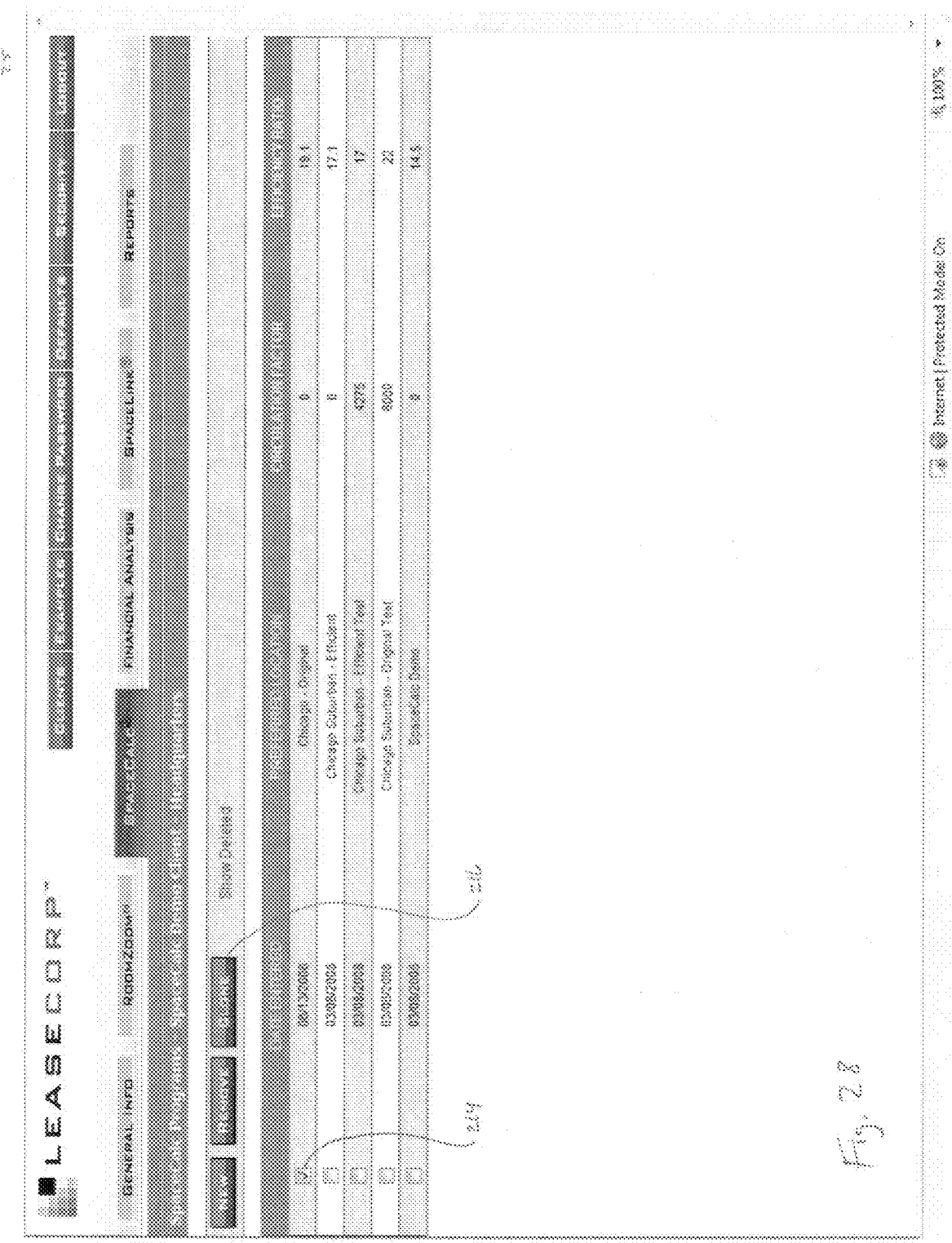

The user selects the Save icon 248 in the lower right corner of the screen of FIG. 27 and the screen of FIG. 28 is displayed. The space program "Chicago—Original" appears in the first line of the list of space programs of the screen of FIG. 28. The space program "Chicago—Original" now accurately includes all three of the components of the user's currently leased space, that is, the efficiency of the existing building, the exact space program (net square feet) and the circulation area used in the space.

The user may now create a space program for a more efficient use of space by creating a space program to reflect the user's current space needs, an efficient building and an efficient design that economizes the use of circulation area. To accomplish this, the user has two options. They can either create a new space program from scratch (as earlier identified) or, to save time, they can clone (copy) the original space program and make necessary adjustments. To create a new report, the user enters the new space program (to identify the more efficient net square footage) and the new building efficiency ratio. In cases where the efficient building has not yet been identified, the user may enter a building efficiency ratio that is typically considered efficient. Since the program defaults to its efficient circulation projection, all three aspects of creating a more efficient space (program, building, planning) are represented.

In cases where the original space program is very similar to the new and more efficient space program, the user may elect to use the cloning feature of the system to save time. To clone a report, with reference to FIG. 28, the user selects the space program ("Chicago—Original") entered above by clicking on box 214 and selecting the Clone icon 216. As a result, the screen of FIG. 28 is updated with a listing for the cloned space program, listed in the next to last line of FIG. 29 as "Copy of Chicago—Original." The user double-clicks on this line and the screen of FIG. 24 is displayed. The user next clicks on the Floor Plan Details tab 218 of FIG. 24, and the screen of FIG. 30 is displayed.

Figure 30:
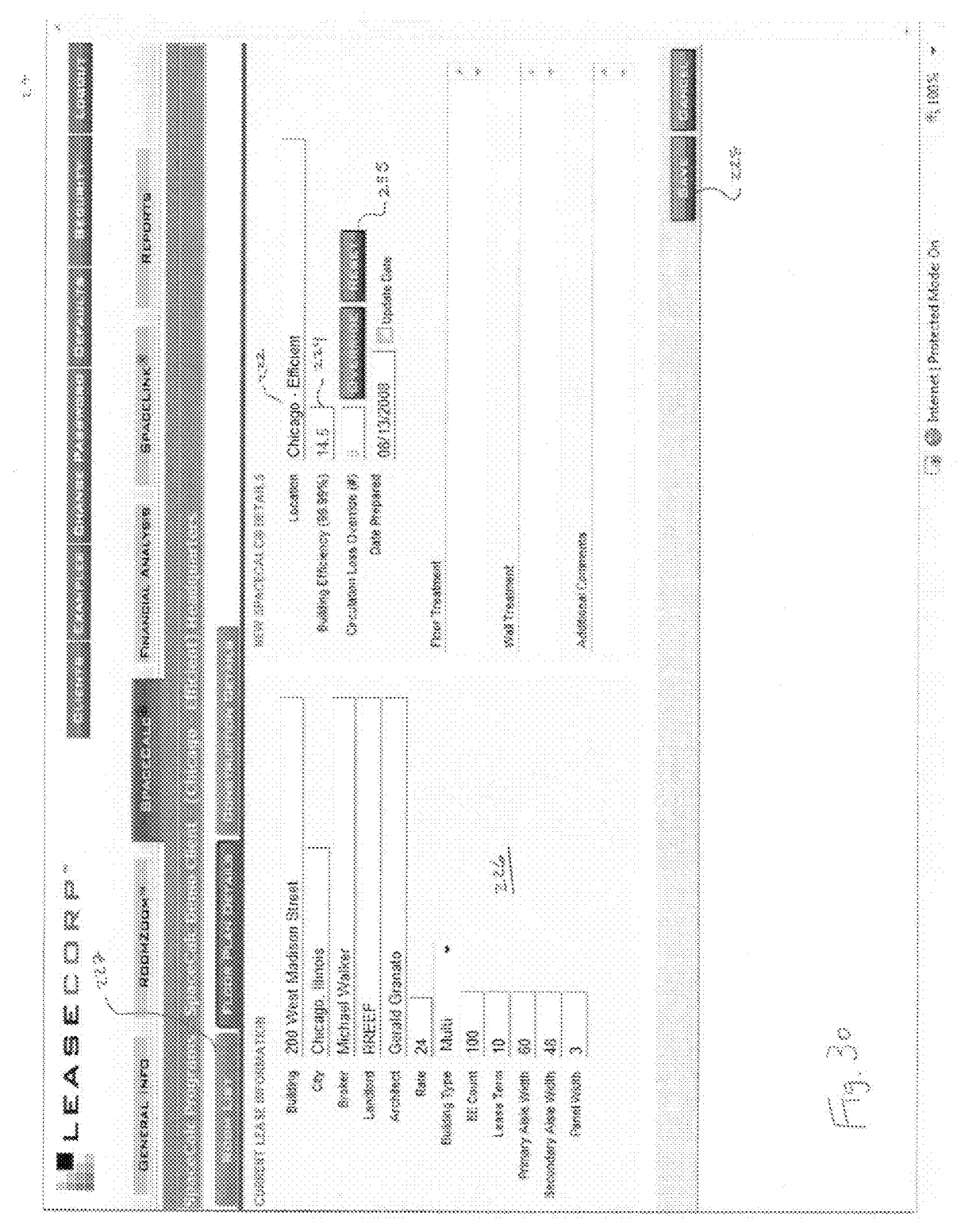

The user next changes the title of the space program in the field 222 of the screen of FIG. 30, as well as the Building Efficiency (inefficiency factor) in field 224, in this case to 14.5. Now that the space program is complete for the more efficient building. The new building address may be entered into the fields of portion 226 of the screen of FIG. 30 if known. The building may, of course, be merely a hypothetical building having the efficiency of 14.5, in which case the address is left the same.

The user next selects the Room List tab 227 of the screen of FIG. 30. The room sizes of table 192 of FIG. 23 and net square footage of field 194 of FIG. 23, which are the room sizes and net square footage of the user's current space, are displayed to the user. The user may now adjust the room sizes to better match the new more efficient requirements by clicking on the desired room in table 192 of FIG. 23 so that portion 206 of the screen of FIG. 23 is displayed and available for data entry.

The system of commonly owned U.S. patent application Ser. No. 12/172,602, the contents of which are hereby incorporated by reference, provides a tool that allows users to view different areas contained in a typical office environment and immediately evaluate the financial impact of eliminating or reducing the size of the area(s), making it easy to decide all areas within their future space and crate their new space program.

Figure 31:
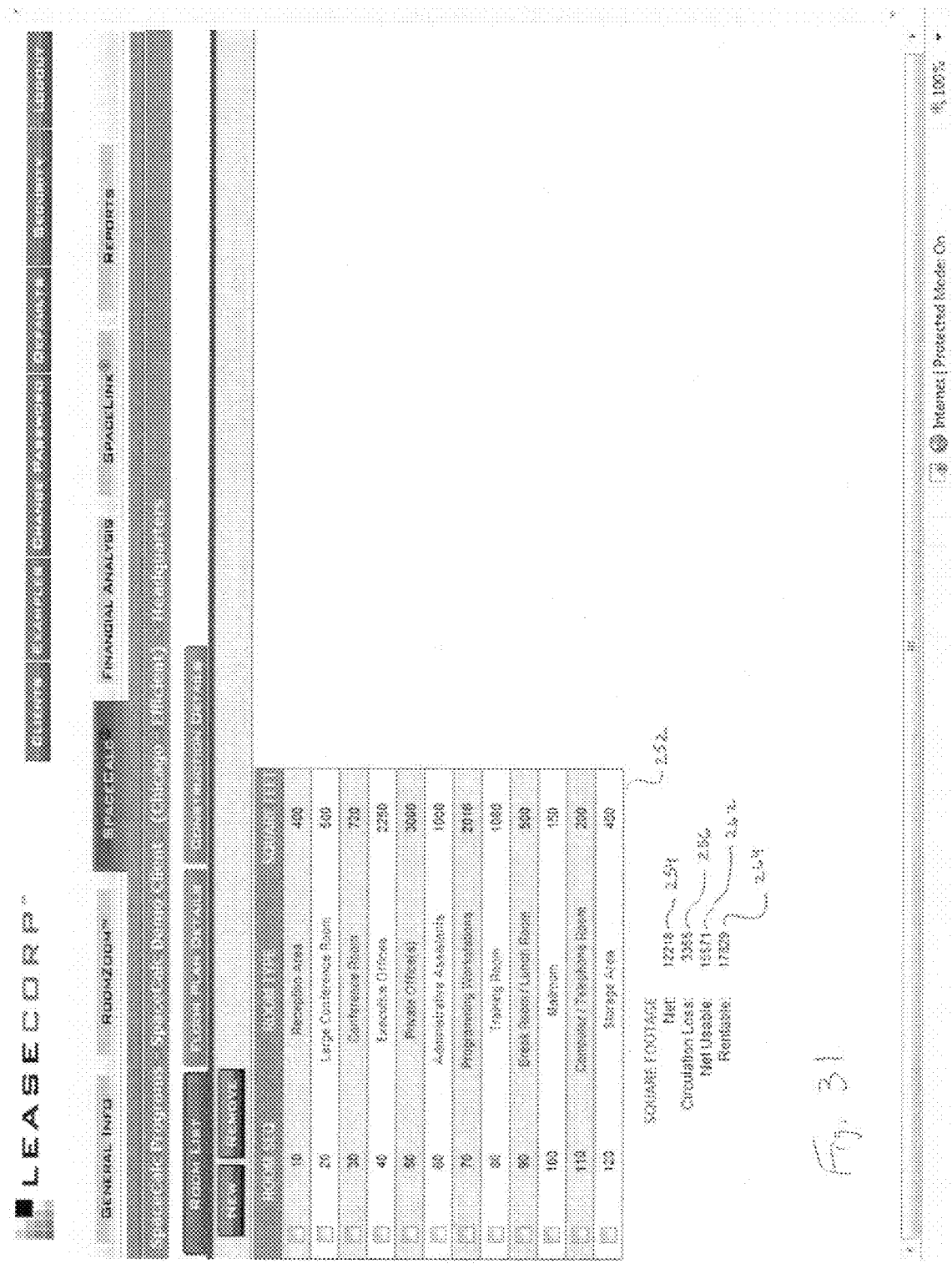

After the user has updated the desired room sizes, the screen of FIG. 31 is displayed, which includes table 252 featuring the adjusted room sizes as well as a new total net square footage in Net field 254. As with the screen of FIG. 23, the system preferably uses the method described above (under "Phase 1: Circulation Factor Calculation") to calculate a circulation loss for the space program. However, if the circulation factor had previously been overridden, the user would need to "reset" the circulation factor, by selecting the Reset icon 255 of the screen of FIG. 30, so that the program would again default to the original circulation calculation. This circulation loss is presented in field 256 of the screen of FIG. 31. Fields 254 and 256 are added to provide the Net Usable space, field 262. The Net Usable space is multiplied by the Building Efficiency (inefficiency factor) entered in field 224 of FIG. 30 in decimal form (0.145) and the result is added to the Net Usable space to arrive at the Rentable space displayed in field 264 of FIG. 31. In the example presented in FIGS. 30 and 31, the inefficiency factor is 14.5% which, when multiplied by the Net Usable amount of 15571 square foot gives a total of 2258 (rounded). Adding 2258 to 15571 (field 262) gives 17829 square foot (field 264).

Figure 32:
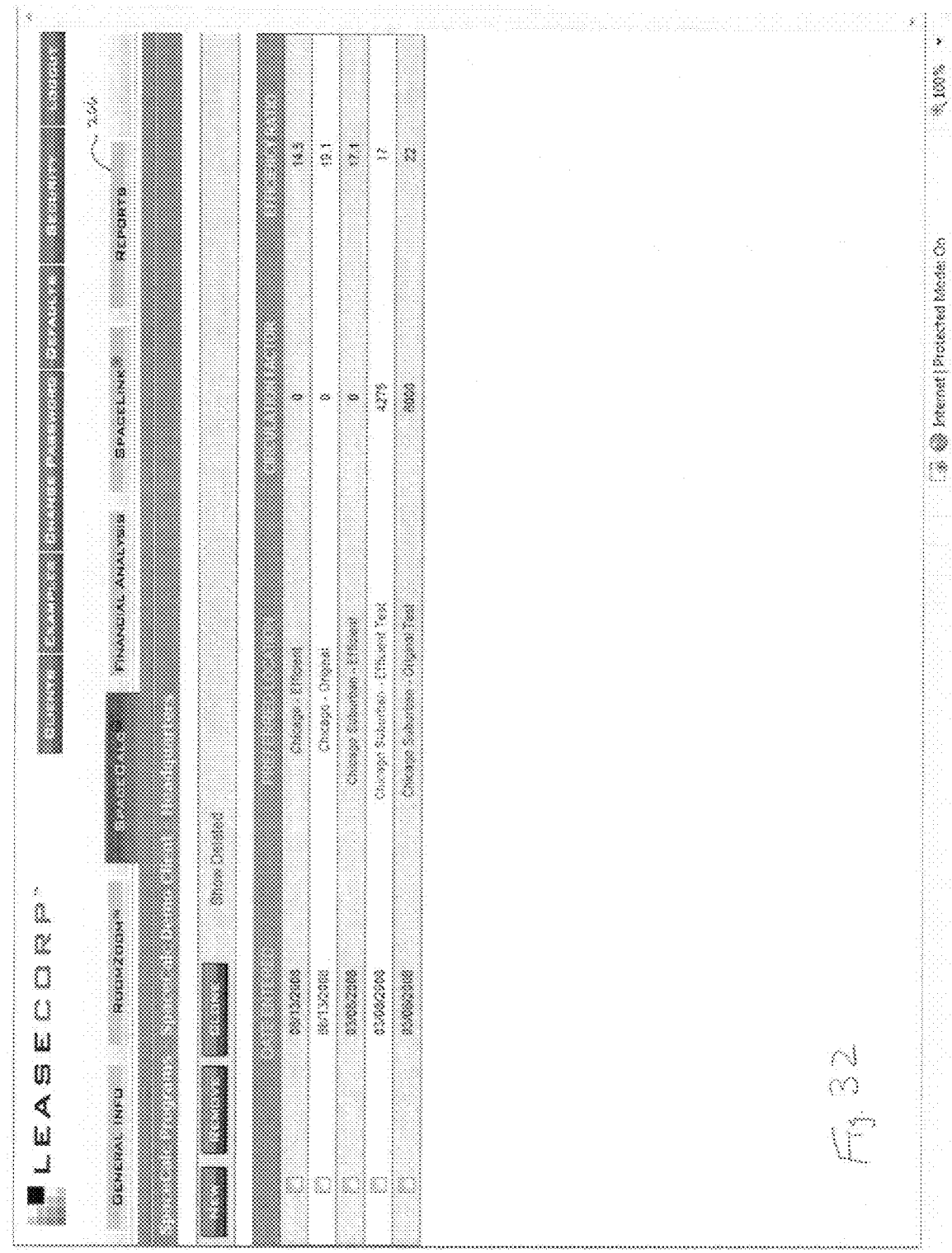

The user saves the revised efficient space program and the screen of FIG. 32 is displayed. The space program "Chicago—Efficient" now accurately includes the data for the user's ideal, efficient space.

Figure 33:
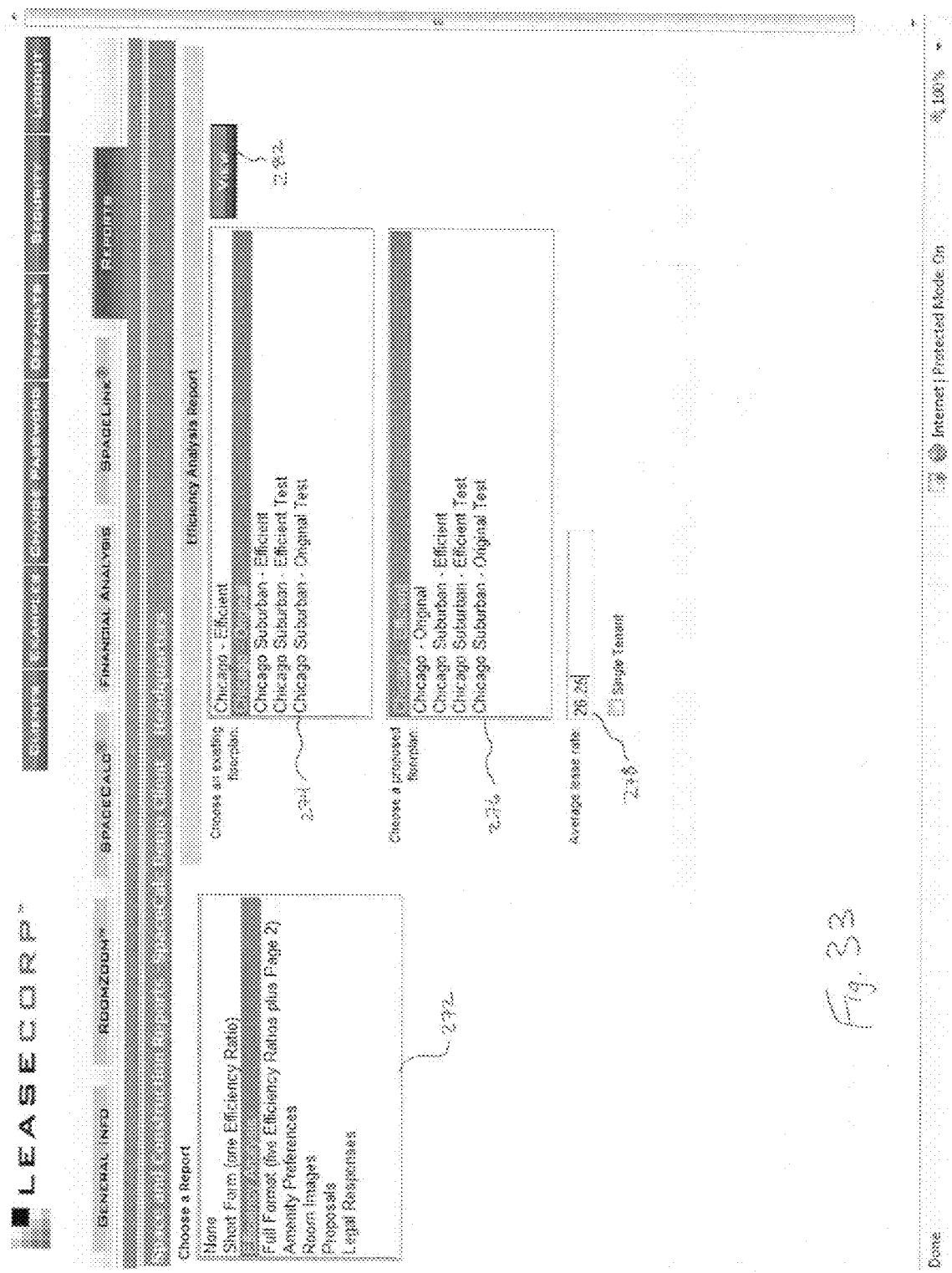

The user selects the Reports tab 266 of the screen of FIG. 32, and the reporting screen of FIG. 33 is displayed. The user selects Efficiency Analysis from the Choose a Report list 272 of the screen of FIG. 33. The user next chooses the space program name for the currently leased space from "existing floorplan" list 274 and the name of the space program for comparison purposes from the "proposed floorplan" list 276. As an example, in FIG. 33, the user has selected the "Chicago—Original" and, the "Chicago—Efficient" space programs, created above, as the existing and proposed floor plans/space programs. The user also enters an estimated average rental rate or occupancy cost throughout the lease term (the system preferably defaults to a ten year period unless otherwise directed) in the Average lease rate field 278. The user then clicks on the View icon 282 of the screen of FIG. 33 to view the Efficiency Analysis Report.

An example of the Efficiency Analysis Report is presented in FIG. 34.

In order to create the report of FIG. 34, the system compares the use of space in the original and proposed space programs (in the present example, "Chicago—Original" and "Chicago—Efficient"). More specifically, the system compares the Net square footage of each option to determine the amount of space (on a square foot basis and percentage basis) that could be eliminated due to obsolescence inefficiencies. The Programming Inefficiency on a square foot basis is presented in line 292 of the report of FIG. 34 after being calculated using the following formulas:

Programming Inefficiency=Net Square Footage of Current Space Program (field 194 of FIG. 23)− Net Square Footage of Efficient Space Program (field 254 of FIG. 32).

The above total is divided by the Rentable square footage of the current space program (field 235 of FIG. 30) to derive the Programming Inefficiency on a percentage basis.

The Building Inefficiency is presented in line 294 of the report of FIG. 34. The system compares the building inefficiency factors of each space program option to determine the amount of space (oil a square foot basis and percentage basis) that could be eliminated due to building inefficiencies. The Building Inefficiency on a square foot basis is calculated by the system through use the following formula:

Building Inefficiency=(Inefficiency Factor of Current Space Program (field 162 of FIG. 15)×Net Usable Square Feet of Current Space Program)− (Inefficiency Factor of Efficient Space Program (field 224 of FIG. 27)×Net Usable Square Feet of the Current Space Program).

In the above equation the Net Usable Square Feet of Current Space Program equals the Net square feet from field 194 of FIG. 23 plus the Circulation Loss Override (i.e. corrected circulation loss) from field 244 of FIG. 31. In the present example, this is 13859+4399=18258.

The Building Inefficiency on a square foot basis is divided by the Rentable square footage of the current space program (field 235 of FIG. 30) to derive the Building Inefficiency on a percentage basis.

The Space Plan Inefficiency is presented in line 296 of the report of FIG. 34. The system compares the circulation areas of each space program to determine the amount of space (on a square foot basis and percentage basis) that could be eliminated due to space planning inefficiencies. The system simply subtracts the Circulation Loss of the efficient space program (field 256 of FIG. 32) from the Circulation Loss of the current space program (field 244 of FIG. 31) to obtain the Space Plan Inefficiency on a square foot basis.

The Space Plan Inefficiency on a square foot basis is divided by the Rentable square footage of the current space program (field 235 of FIG. 30) to derive the Space Plan Inefficiency on a percentage basis.

The system also compares the user's current square footage with the projected efficient total square footage to determine the amount of space (on a square foot basis and percentage basis) that could be eliminated clue to all inefficiencies. This information is provided in line 298 of the report of FIG.

34 and is simply calculated on a square foot basis by subtracting the Rentable square feet of the efficient space program in field 264 of FIG. 32 from the Rentable square feet of the current space program in field 235 of FIG. 30. The percentage basis is obtained by dividing this total by the Rentable square footage of the current space program (field 235 of FIG. 30).

Once the total amount of space loss has been calculated, that amount can be multiplied by the estimated average rental rate from field 278 of FIG. 33 to determine the total amount of potential savings as a result of moving to more efficient space. This information is also presented in the Efficiency Analysis Report, as illustrated in FIG. 34.

Figure 35:
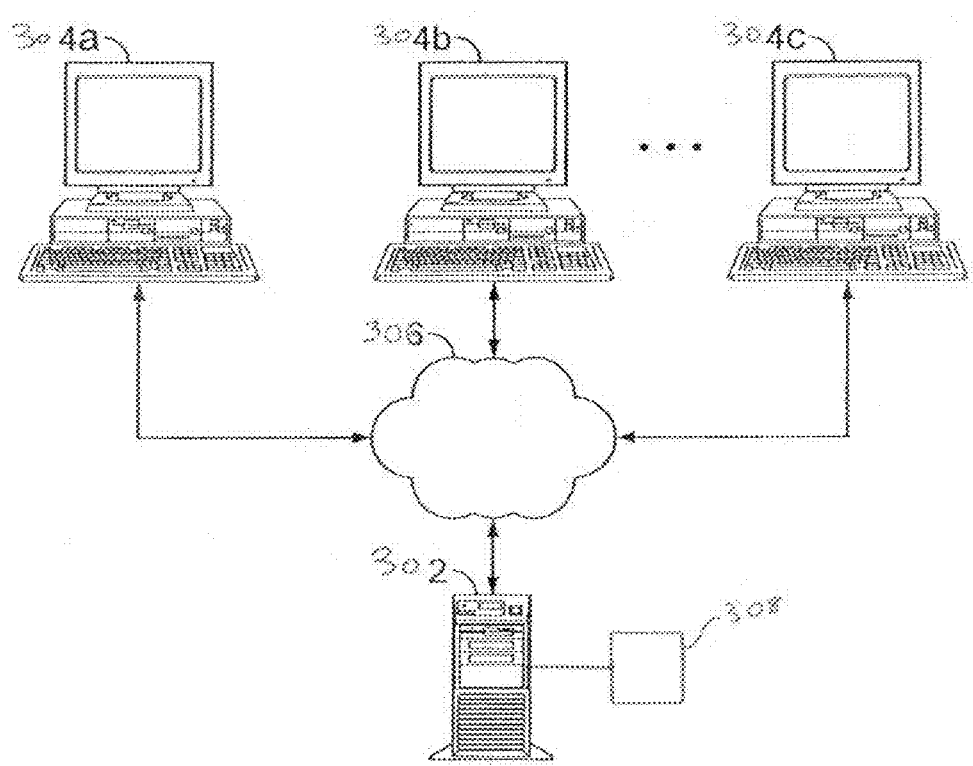
FIG. 35 is a schematic illustrating an embodiment of the system of the invention.

The hardware of an embodiment of the system of the invention is illustrated in FIG. 35. The system features a server computer 302 including a processor or microprocessor and memory storage. The application software for performing the calculations described above is loaded onto the server 302 hard drive. The server 302 also includes databases that store the data entered into and used for calculations by the application software. As an example only, the application may be written in Visual Basic 6.0 or Visual Basic .Net with MICROSOFT ACCESS 3.0 or SQL Server as a data container. The formulas and code for performing circulation factor calculations, inefficiency factor calculations and other calculations, described above may also be programmed in Visual Basic for Applications (MICROSOFT WORD), standard spreadsheet applications (MICROSOFT EXCEL) and standard programming languages such as SEQUEL. The data can be migrated into any compatible database.

As illustrated in FIG. 35, user workstations 304*a*-304*c* featuring displays, such as personal computers, communicate with the server 302 through a network 306 such as a local area network or the Internet (using, for example, Microsoft's .NET framework and a web server). User's workstations 304*a*-304*c* may connect to the application and database on server 302, for example, through ODBC (Open Database Connectivity). As an alternative to a network system, the application software and database may reside on a standalone personal computer which acts as both the server and workstation. The server or personal computer may include a compact disk (CD) drive so that the application software may be downloaded or run off of a CD itself. The application software may alternatively be stored on other types of machine-readable mediums. A printer 308 is attached to the server and may be alternatively, or in addition, attached to workstations 304*a*-304*c* to print reports.

While the preferred embodiments of the invention have been shown and described, it will be apparent to those skilled in the art that changes and modifications may be made therein without departing from the spirit of the invention; the scope of which is defined by the appended claims.

What is claimed is:

1. A system for comparing an original real estate space and a proposed real estate space comprising:
   a. a workstation;
   b. a server in communication with the workstation, said server having software and memory storage which permits a user to enter an efficiency measure directed to a loss in usable space for a building of the original real estate space, a space program for the original real estate space,
      an efficiency measure directed to a loss in usable space for a building of the proposed real estate space and a space program for the proposed real estate space,
      said software using the space program for the original real estate space to calculate a circulation loss for each room of the space program by:
      i) for a room having an area greater than or equal to a user specified area size, calculating a corresponding circulation loss using a user specified aisle width and the area of the room:
      ii) for a room having an area less than the user specified area size, calculating a corresponding circulation loss using a user specified number of individual workstations for a workstation cluster, the user specified aisle width and the area of the room;
      and to calculate a total circulation loss based on a total of the circulation losses for each room of the space program for the original real estate space and the space program for the proposed real estate space to calculate a circulation loss for each room of the space program by:
      i) for a room having an area greater than or equal to a user specified area size, calculating a corresponding circulation loss using a user specified aisle width and the area of the room:
      ii) for a room having an area less than the user specified area size, calculating a corresponding circulation loss using a user specified number of individual workstations for a workstation cluster, the user specified aisle width and the area of the room;
      and to calculate a total circulation loss based on a total of the circulation losses for each room of the space program for the proposed real estate space, and
      said software calculating inefficiency measures of the original real estate space compared to the proposed real estate space based on the building efficiency measures, space programs and total circulation losses for the original and proposed real estate spaces, said inefficiency measures including a programming inefficiency, a building inefficiency and a space plan inefficiency.

2. The system of claim 1 wherein the software also:
   i) calculates an original net space by adding areas of the space program for the original real estate space;
   ii) adds the total circulation loss for the original real estate space to the original net space to calculate an original net usable space; and
   iii) multiplies the original net usable space by the efficiency measure for the building of the original real estate space to calculate an original rentable space.

3. The system of claim 1 wherein the software calculates the programming inefficiency by:
   i) calculating an original net space by adding areas of the space program for the original real estate space;
   ii) calculating a proposed net space by adding areas of the space program for the proposed real estate space; and
   iii) subtractings the proposed net space from the original net space to calculate a programming inefficiency that is included in the inefficiency measures.

4. The system of claim 2 wherein the software divides the programming inefficiency by the original rentable space so that the inefficiency measures include the programming inefficiency on a percentage basis.

5. The system of claim 1 wherein the software calculates the building inefficiency by:
   i) calculating an original net space by adding areas of the space program for the original real estate space;
   ii) adding the total circulation loss for the original real estate space to the original net space to calculate an original net usable space;
   iii) multiplying the original net usable space by the efficiency measure of the building of the original real estate space;

iv) multiplying the original net usable space by the efficiency measure of the building of the proposed real estate space; and v), subtracting the result of step iv) from the result of step iii) to calculate the building inefficiency that is included in the inefficiency measures.

6. The system of claim 2 wherein the software divides the building inefficiency by the original rentable space so that the inefficiency measures include the building inefficiency on a percentage basis.

7. The system of claim 1 wherein the software subtracts the circulation loss for the proposed real estate space from the circulation loss for the original real estate space to calculate the space plan inefficiency that is included in the inefficiency measures.

8. The system of claim 2 wherein the software subtracts the total circulation loss for the proposed real estate space from the total circulation loss for the original real estate space and divides the result by the original rentable space to calculate a space plan inefficiency on a percentage basis that is included in the inefficiency measures.

9. The system of claim 1 wherein each efficiency measure includes an inefficiency factor.

10. The system of claim 1 wherein each efficiency measure includes an efficiency ratio.

11. The system of claim 1 wherein the memory and software of the server further permits a user to enter an average rental rate and wherein the average rental rate is used by the software to calculate the inefficiency measure on a dollar basis.

12. The system of claim 1 further comprising a printer and wherein the memory and software of the server permit the printing of a report by the printer that includes the inefficiency measure.

13. A non-transitory machine readable medium on which has been prerecorded a computer program which, when executed by a computer, performs the following steps:
   a. receives an efficiency measure directed to a loss in usable space for a building of the original real estate space;
   b. receives a space program for the original real estate space;
   c. calculates a circulation loss for each room of the space program by:
      i) for a room having an area greater than or equal to a user specified area size, calculating a corresponding circulation loss using a user specified aisle width and the area of the room:
      ii) for a room having an area less than the user specified area size, calculating a corresponding circulation loss using a user specified number of individual workstations for a workstation cluster, the user specified aisle width and the area of the room;
      and calculates a total circulation loss based on a total of the circulation losses for each room of the space program for the original real estate space;
   d. receives an efficiency measure directed to a loss in usable space for a building of the proposed real estate space;
   e. receives a space program for the proposed real estate space;
   f. calculates a circulation loss for each room of the space program by:
      i) for a room having an area greater than or equal to a user specified area size, calculating a corresponding circulation loss using a user specified aisle width and the area of the room:
      ii) for a room having an area less than the user specified area size, calculating a corresponding circulation loss using a user specified number of individual workstations for a workstation cluster, the user specified aisle width and the area of the room;
      and calculates a total circulation loss based on a total of the circulation losses for each room of the space program for the proposed real estate space; and
   g. calculates inefficiency measures of the original real estate space compared to the proposed real estate space based on the building efficiency measures, space programs and total circulation losses for the original and proposed real estate spaces, said inefficiency measures including a programming inefficiency, a building inefficiency and a space plan inefficiency.

14. The machine readable medium of claim 13 which, when executed by a computer, also performs the following steps:
   h. calculates an original net space by adding areas of the space program for the original real estate space;
   i. adds the circulation loss for the original real estate space to the original net space to calculate an original net usable space;
   j. multiplies the original net usable space by the efficiency measure for the building of the original real estate space to calculate an original rentable space.

15. The machine readable medium of claim 13 which, when executed by a computer, calculates the programming inefficiency by performing the steps of:
   i) calculating an original net space by adding areas of the space program for the original real estate space;
   ii) calculating a proposed net space by adding areas of the space program for the proposed real estate space; and
   iii) subtracting the proposed net space from the original net space to calculate the programming inefficiency that is included in the inefficiency measures.

16. The machine readable medium of claim 14 which, when executed by a computer, also performs the step of dividing the programming inefficiency by the original rentable space so that the inefficiency measures includes the programming inefficiency on a percentage basis.

17. The machine readable medium of claim 13 which, when executed by a computer, calculates the building inefficiency by performing the steps of:
   i) calculating an original net space by adding areas of the space program for the original real estate space;
   ii) adding the total circulation loss for the original real estate space to the original net space to calculate an original net usable space;
   iii) multiplying the original net usable space by the efficiency measure of the building of the original real estate space;
   iv) multiplying the original net usable space by the efficiency measure of the building of the proposed real estate space;
   v) subtracting the result of step iv) from the result of step iii) to calculate the building inefficiency that is included in the inefficiency measures.

18. The machine readable medium of claim 14 which, when executed by a computer, also performs the step of dividing the building inefficiency by the original rentable space so that the inefficiency measures includes the building inefficiency on a percentage basis.

19. The machine readable medium of claim 13 which, when executed by a computer, also performs the step of subtracting the total circulation loss for the proposed real estate space from the total circulation loss for the original real estate space to calculate the space plan inefficiency that is included in the inefficiency measures.

20. The machine readable medium of claim 14 which, when executed by a computer, also performs the step of subtracting the total circulation loss for the proposed real estate space from the total circulation loss for the original real estate space and dividing the result by the original rentable space to calculate a space plan inefficiency on a percentage basis that is included in the inefficiency measures.

21. The machine readable medium of claim 13 wherein each efficiency measure includes an inefficiency factor.

22. The machine readable medium of claim 13 wherein each efficiency measure includes an efficiency ratio.

23. The machine readable medium of claim 13 which, when executed by a computer, also performs the steps of receiving an average rental rate and wherein the average rental rate is used by the software to calculate at least one of the inefficiency measures on a dollar basis.

\* \* \* \* \*

UNITED STATES PATENT AND TRADEMARK OFFICE
CERTIFICATE OF CORRECTION

| | |
|---|---|
| PATENT NO. | : 8,571,997 B2 |
| APPLICATION NO. | : 12/244377 |
| DATED | : October 29, 2013 |
| INVENTOR(S) | : Michael Walker |

It is certified that error appears in the above-identified patent and that said Letters Patent is hereby corrected as shown below:

In the Claims

Column 20, claim 3, line 51: replace the word "subtractings" with the word --subtracting--
Column 21, claim 5, line 4: delete the ","

Signed and Sealed this
Thirteenth Day of May, 2014

Michelle K. Lee
*Deputy Director of the United States Patent and Trademark Office*